US008872962B2

(12) United States Patent
Fukuda

(10) Patent No.: US 8,872,962 B2
(45) Date of Patent: Oct. 28, 2014

(54) FOCUS DETECTION APPARATUS AND IMAGE PICKUP APPARATUS

(75) Inventor: Koichi Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 13/809,982

(22) PCT Filed: Jul. 29, 2011

(86) PCT No.: PCT/JP2011/067917
§ 371 (c)(1),
(2), (4) Date: Jan. 14, 2013

(87) PCT Pub. No.: WO2012/018102
PCT Pub. Date: Feb. 9, 2012

(65) Prior Publication Data
US 2013/0113987 A1    May 9, 2013

(30) Foreign Application Priority Data
Aug. 3, 2010 (JP) ................. 2010-174457

(51) Int. Cl.
H04N 5/232 (2006.01)
H04N 3/14 (2006.01)
H04N 5/228 (2006.01)
H04N 13/02 (2006.01)
G03B 13/36 (2006.01)
G02B 7/28 (2006.01)
H04N 5/369 (2011.01)

(52) U.S. Cl.
CPC ............ H04N 5/23212 (2013.01); G03B 13/36 (2013.01); G02B 7/28 (2013.01); H04N 5/3696 (2013.01)
USPC ........... 348/349; 348/302; 348/222.1; 348/49

(58) Field of Classification Search
USPC .................. 348/349, 302, 222.1, 49
See application file for complete search history.

(56) References Cited

U.S. PATENT DOCUMENTS

| 4,410,804 A | 10/1983 | Stauffer |
| 7,859,588 B2 * | 12/2010 | Parulski et al. ............... 348/349 |
| 2004/0179128 A1 | 9/2004 | Oikawa |
| 2010/0157094 A1 | 6/2010 | Takamiya |
| 2011/0164165 A1 | 7/2011 | Hashimoto et al. |
| 2011/0228053 A1 * | 9/2011 | Aoki .............................. 348/49 |

FOREIGN PATENT DOCUMENTS

| JP | 58-24105 A | 2/1983 |
| JP | 5-127074 A | 5/1993 |
| JP | 2004-191629 A | 7/2004 |
| JP | 2005-106994 A | 4/2005 |
| JP | 2009-258230 A | 11/2009 |
| JP | 2010-117679 A | 5/2010 |
| JP | 2010-152006 A | 7/2010 |

* cited by examiner

*Primary Examiner* — Joel Fosselman
(74) *Attorney, Agent, or Firm* — Fitzpatrick, Cella, Harper & Scinto

(57) ABSTRACT

The focus detection apparatus includes an image pickup part (101-107) including first and second pixels photoelectrically converting first and second images formed by light fluxes passing through different pupil area of an image-forming optical system to produce first and second image signals, a first signal processor (121) performing a first process to smooth the first and second image signals by using mutually different filters, a second signal processor (121) performing a second process to sharpen the first and second image signals by using mutually different filters. A calculating part (121) calculates a defocus amount by using the first and second image signals subjected to the first process when a contrast value is higher than a predetermined value, and calculates the defocus amount by using the first and second image signals subjected to the second process when the contrast value is lower than the predetermined value.

7 Claims, 24 Drawing Sheets

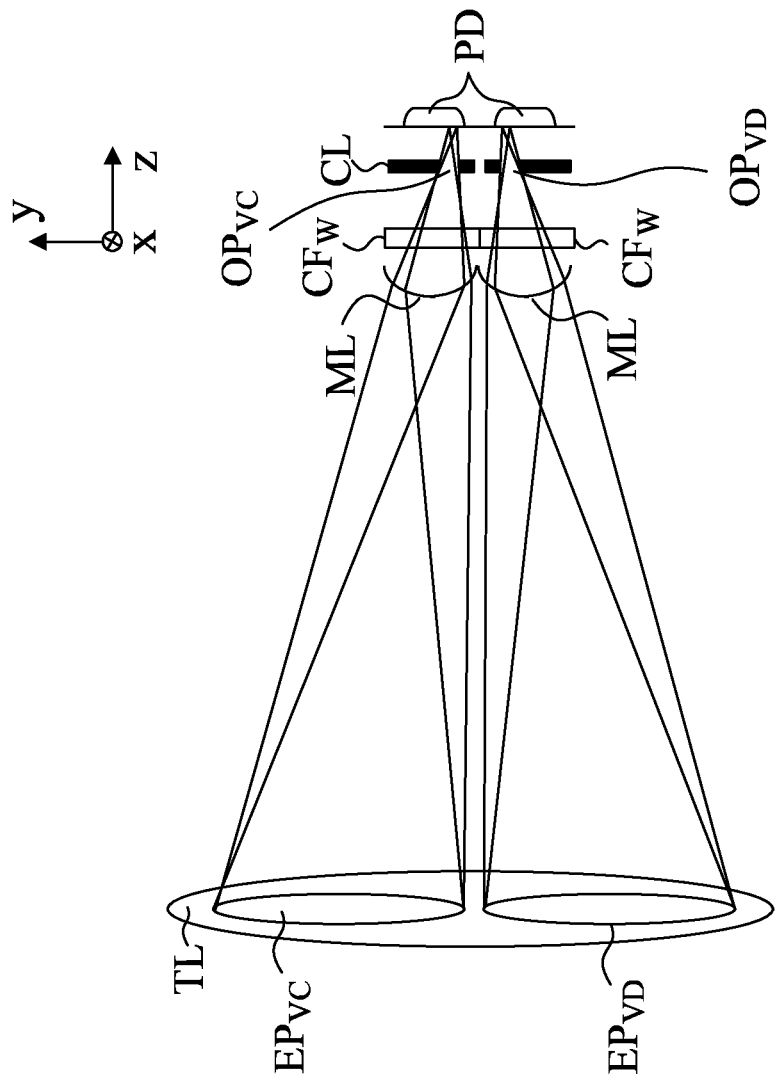
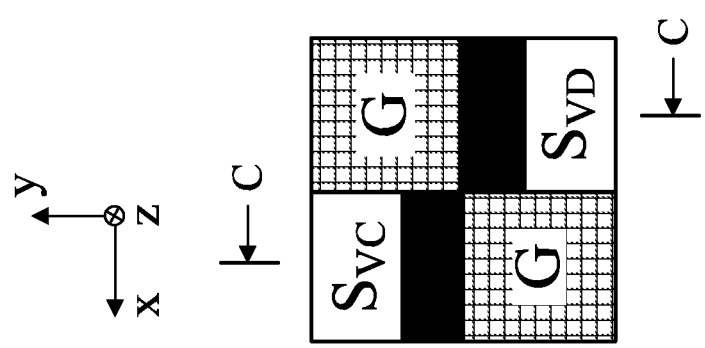
FIG. 7B
FIG. 7A

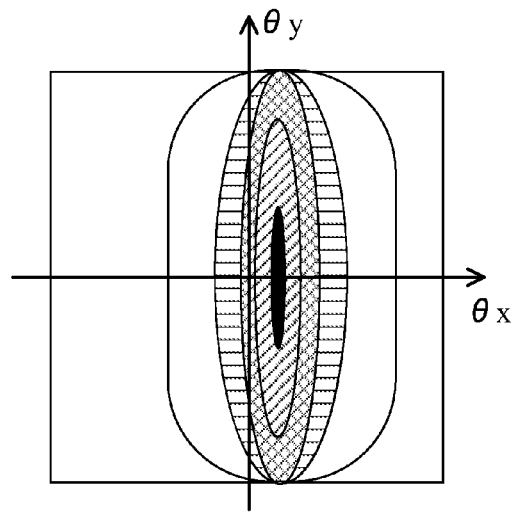 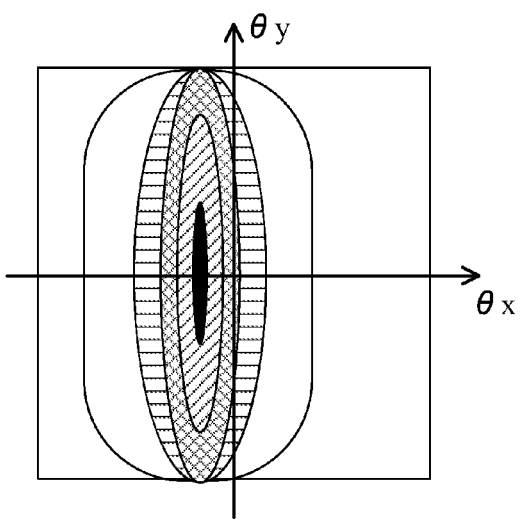
FIG. 10A  FIG. 10B
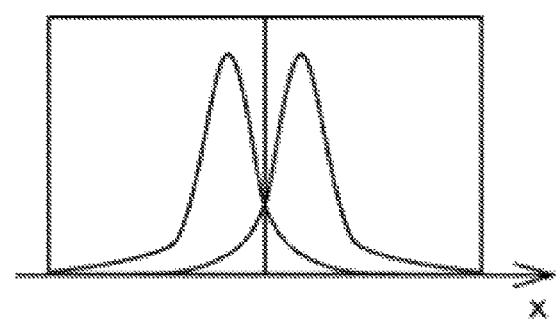
FIG. 11

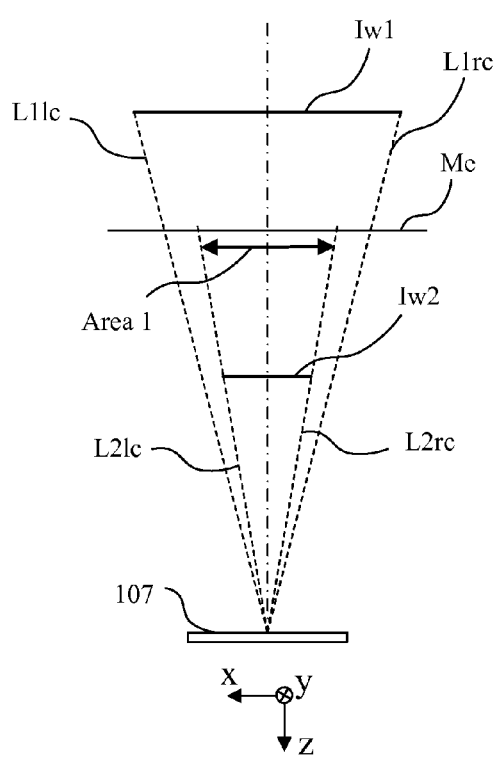
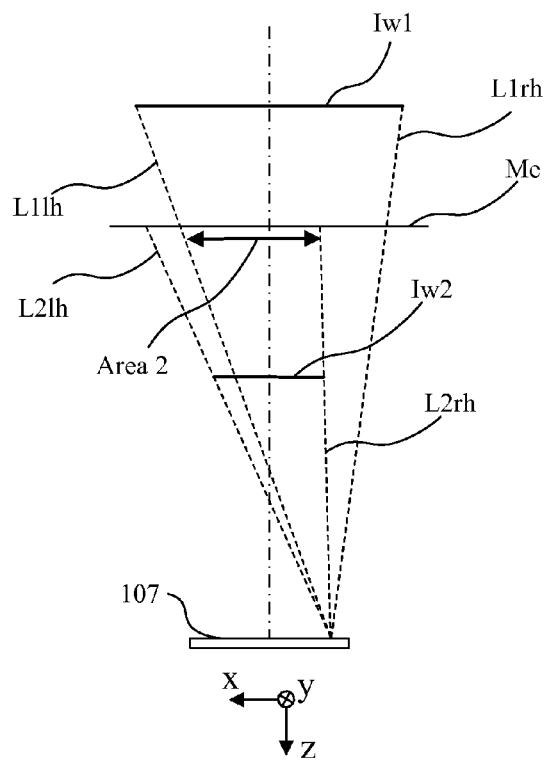
FIG. 12A　　　　　　　FIG. 12B
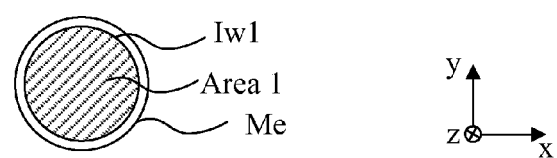
FIG. 13A
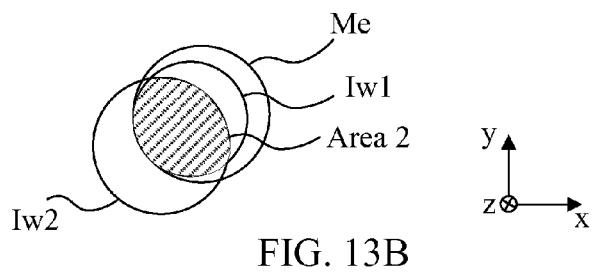
FIG. 13B

FOCUS DETECTION APPARATUS AND IMAGE PICKUP APPARATUS

TECHNICAL FIELD

The present invention relates to a focus detection apparatus that detects a focus state of an image-forming optical system using an output signal from an image sensor capable of photoelectrically converting an optical image formed by the image-forming optical system, and to an image pickup apparatus provided therewith such as a digital camera.

BACKGROUND ART

Regarding focus detection apparatuses for detecting a focus state of an image-forming optical system, Japanese Patent Laid-Open No. 58-24105 discloses an apparatus that performs pupil division focus detection using a two-dimensional image sensor (image pickup element) having a micro-lens formed in each pixel. In the apparatus disclosed in Japanese Patent Laid-Open No. 58-24105, a photoelectric converting part in each pixel of the image sensor is divided into plural portions, and the divided plural portions of the photoelectric converting part receive, through the micro-lens, light fluxes passing through mutually different areas of a pupil of the image-forming optical system.

Moreover, Japanese Patent Laid-Open No. 2005-106994 discloses an image pickup apparatus that performs the pupil division focus detection using a CMOS sensor which is a type of the image sensors. In the apparatus disclosed in Japanese Patent Laid-Open No. 2005-106994, part of a large number of pixels included in the CMOS sensor has a structure in which a photoelectric converting part is divided into two in order to detect a focus state of an image-taking (image-forming) optical system. The two-divided portions of the photoelectric converting part receive, through a micro-lens, light fluxes passing through mutually different areas in a pupil of the image-taking optical system.

The pupil division focus detection performs correlation calculation on image signals obtained by the photoelectric conversion of an A-image and a B-image respectively formed by the light fluxes passing through the mutually different areas (an A-pupil area and a B-pupil area) in the pupil of the image-forming optical system to calculate a phase difference of the A- and B-images, and calculates a defocus amount of the image-forming optical system on the basis of the phase difference.

Regarding the correlation calculation for the image signals obtained by the photoelectric conversion of the A- and B-images, Japanese Patent Laid-Open No. 5-127074 discloses a method that transforms a specific filter according to an aperture ratio of the image-forming optical system, an exit pupil position or a phase difference amount, and performs a filtering process on the image signals using the transformed filter.

The focus detection of the image-forming optical system is generally capable of detecting a focus state not only for an object located in a central part of an image pickup area (image-capturing frame), but also for an object located in a marginal part thereof. However, in the marginal part, the A- and B-pupil areas may be asymmetric with each other due to light flux vignetting caused by an optical element holding member that holds an optical element such as a lens constituting part of the image-forming optical system. Such asymmetry of the A- and B-pupil areas reduces a degree of coincidence between the A- and B-images, which deteriorates focus detection accuracy.

In order to suppress such reduction of the degree of coincidence between the A- and B-images, Japanese Patent Laid-Open No. 2010-117679 discloses a method that performs image restoration according to a vignetting state by convolution of the A-image with a line image corresponding to the B-pupil area and convolution of the B-image with a line image corresponding to the A-pupil area.

However, in the image restoration method disclosed in Japanese Patent Laid-Open No. 2010-117679, the convolution with the line image of each pupil area decreases sharpness of the A- and B-images after the restoration as compared with the A- and B-images before the restoration. The decrease of the sharpness may deteriorate focus detection accuracy in cases of performing image capturing for a low contrast object, having a large defocus amount and setting a small (bright) aperture value.

SUMMARY OF INVENTION

The present invention provides a focus detection apparatus capable of performing appropriate image restoration according to the contrast, defocus amount and aperture value to improve the focus detection accuracy, and also provides an image pickup apparatus provided therewith.

The present invention provides as one aspect thereof a focus detection apparatus that include an image pickup part configured to include first pixels photoelectrically converting a first image formed by a light flux passing through a first pupil area of an image-forming optical system to produce a first image signal and second pixels photoelectrically converting a second image formed by a light flux passing through a second pupil area of the image-forming optical system to produce a second image signal, a first signal processor configured to perform a first process to smooth the first and second image signals by using mutually different filters for the first and second image signals, a second signal processor configured to perform a second process to sharpen the first and second image signals by using mutually different filters for the first and second image signals, and a calculating part configured to calculate a defocus amount of the image-forming optical system by using the first and second image signals on which the first process or the second process has been performed. The apparatus is characterized in that the calculating part is configured to calculate the defocus amount by using the first and second image signals on which the first process has been performed when a contrast value obtained from an output signal from the image pickup part is higher than a predetermined value, and calculate the defocus amount by using the first and second image signals on which the second process has been performed when the contrast value is lower than the predetermined value.

The present invention provides as another aspect thereof a focus detection apparatus that include an image pickup part configured to include first pixels photoelectrically converting a first image formed by a light flux passing through a first pupil area of an image-forming optical system to produce a first image signal and second pixels photoelectrically converting a second image formed by a light flux passing through a second pupil area of the image-forming optical system to produce a second image signal, a first signal processor configured to perform a first process to smooth the first and second image signals by using mutually different filters for the first and second image signals, a second signal processor configured to perform a second process to sharpen the first and second image signals by using mutually different filters for the first and second image signals, and a calculating part configured to calculate a defocus amount of the image-forming optical system by using the first and second image signals on which the first process or the second process has been performed. The apparatus is characterized in that the calculating part is configured to calculate a provisional value of the defocus amount by using the first and second image signals on which the first and second processes have not been performed, and in that the calculating part is configured to calculate the defocus amount by using the first and second image signals on which the first process has been performed when an absolute value of the provisional value is smaller than a predetermined value, and calculate the defocus amount by using the first and second image signals on which the second process has been performed when the absolute value of the provisional value is greater than the predetermined value.

The present invention provides as still another aspect thereof a focus detection apparatus that include an image pickup part configured to include first pixels photoelectrically converting a first image formed by a light flux passing through a first pupil area of an image-forming optical system to produce a first image signal and second pixels photoelectrically converting a second image formed by a light flux passing through a second pupil area of the image-forming optical system to produce a second image signal, a first signal processor configured to perform a first process to smooth the first and second image signals by using mutually different filters for the first and second image signals, a second signal processor configured to perform a second process to sharpen the first and second image signals by using mutually different filters for the first and second image signals, and a calculating part configured to calculate a defocus amount of the image-forming optical system by using the first and second image signals on which the first process or the second process has been performed. The image-forming optical system includes an aperture stop whose aperture value is variable. The apparatus is characterized in that the calculating part is configured to calculate the defocus amount by using the first and second image signals on which the first process has been performed when the aperture value is greater than a predetermined value, and calculate the defocus amount by using the first and second image signals on which the second process has been performed when the aperture value is smaller than the predetermined value.

The present invention provides as yet still another aspect thereof an image pickup apparatus including the above focus detection apparatus, and an image generator configured to produce an image based on an output signal from the image pickup part.

The present invention provides as further still another aspect thereof a focus detection method using an image pickup part configured to include first pixels photoelectrically converting a first image formed by a light flux passing through a first pupil area of an image-forming optical system to produce a first image signal and second pixels photoelectrically converting a second image formed by a light flux passing through a second pupil area of the image-forming optical system to produce a second image signal. The method includes a step of performing a first process to smooth the first and second image signals by using mutually different filters for the first and second image signals, a step of performing a second process to sharpen the first and second image signals by using mutually different filters for the first and second image signals, and a calculating step of calculating a defocus amount of the image-forming optical system by using the first and second image signals on which the first process or the second process has been performed. The method is characterized in that, in the calculating step, the defocus amount is calculated by using the first and second image signals on which the first process has been performed when a contrast value obtained from an output signal from the image pickup part is higher than a predetermined value, and the defocus amount is calculated by using the first and second image signals on which the second process has been performed when the contrast value is lower than the predetermined value.

The present invention provides as yet further still another aspect thereof a focus detection method using an image pickup part configured to include first pixels photoelectrically converting a first image formed by a light flux passing through a first pupil area of an image-forming optical system to produce a first image signal and second pixels photoelectrically converting a second image formed by a light flux passing through a second pupil area of the image-forming optical system to produce a second image signal. The method includes a step of performing a first process to smooth the first and second image signals by using mutually different filters for the first and second image signals, a step of performing a second process to sharpen the first and second image signals by using mutually different filters for the first and second image signals, and a calculating step of calculating a defocus amount of the image-forming optical system by using the first and second image signals on which the first process or the second process has been performed. The method is characterized in that, in the calculating step, a provisional value of the defocus amount is calculated by using the first and second image signals on which the first and second processes have not been performed, and in that, in the calculating step, the defocus amount is calculated by using the first and second image signals on which the first process has been performed when an absolute value of the provisional value is smaller than a predetermined value, and the defocus amount is calculated by using the first and second image signals on which the second process has been performed when the absolute value of the provisional value is greater than the predetermined value.

The present invention provides as yet further still another aspect thereof a focus detection method using an image pickup part configured to include first pixels photoelectrically converting a first image formed by a light flux passing through a first pupil area of an image-forming optical system to produce a first image signal and second pixels photoelectrically converting a second image formed by a light flux passing through a second pupil area of the image-forming optical system to produce a second image signal. The method includes a step of performing a first process to smooth the first and second image signals by using mutually different filters for the first and second image signals, a step of performing a second process to sharpen the first and second image signals by using mutually different filters for the first and second image signals, and a calculating step of calculating a defocus amount of the image-forming optical system by using the first and second image signals on which the first process or the second process has been performed. The image-forming optical system includes an aperture stop whose aperture value is variable. The method is characterized in that, in the calculating step, the defocus amount is calculated by using the first and second image signals on which the first process has been performed when the aperture value is greater than a predetermined value, and the defocus amount is calculated by using the first and second image signals on which the second process has been performed when the aperture value is smaller than the predetermined value.

Further features and aspects of the present invention will become apparent from the following description of exemplary examples with reference to the attached drawings.

BRIEF DESCRIPTION OF DRAWINGS

FIGS. 7A and 7B are a front view and a cross-sectional view of focus detection pixels for vertical pupil division in the image sensor in Example 1.

FIGS. 10A and 10B are schematic views showing an incident angle characteristic of a focus detection pixel located at a central part of the image sensor in Example 1.

FIG. 11 two-dimensionally shows the incident angle characteristics of the above central focus detection pixel.

FIGS. 12A and 12B show light flux vignetting in Example 1.

FIGS. 13A and 13B show pupil areas on a pupil surface in Example 1.

DESCRIPTION OF EMBODIMENTS

Exemplary examples of the present invention will hereinafter be described with reference to the accompanying drawings.

Example 1

Figure 1:
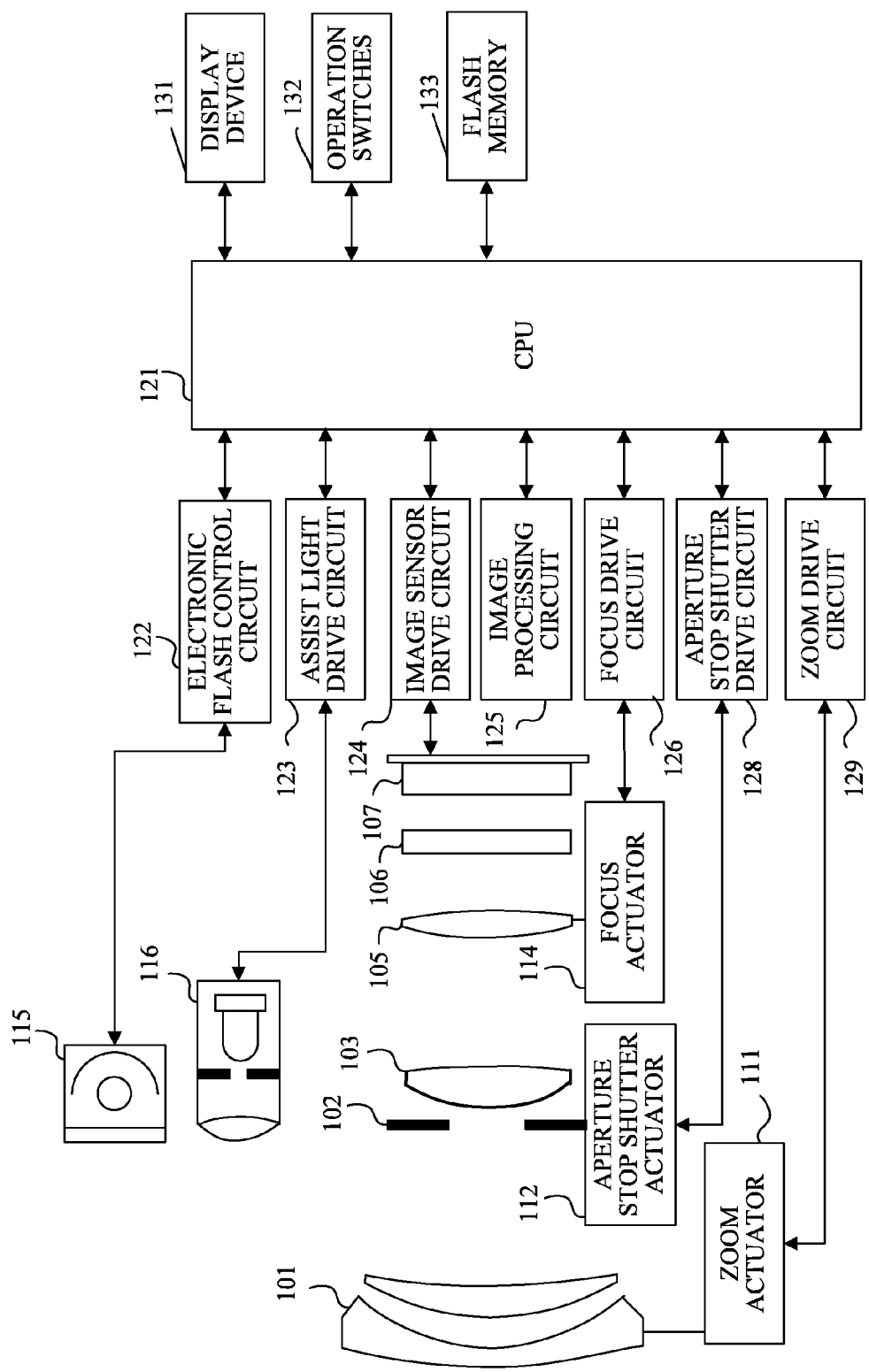
FIG. 1 is a block diagram showing the configuration of a camera that is Example 1 of the present invention.

FIG. 1 shows the configuration of a digital camera (image pickup apparatus) including a focus detection apparatus that is a first example (Example 1) of the present invention. In FIG. 1, reference numeral 101 denotes a first lens group placed closest to an object in an image-taking optical system (image-forming optical system). The first lens group 101 is movable in a direction of an optical axis (hereinafter referred to as an "optical axis direction"). Reference numeral 102 denotes an aperture stop shutter having a stop function of varying its aperture diameter to adjust a light quantity and a shutter function of opening and closing its aperture to control an exposure time when capturing a still image.

Reference numeral 103 denotes a second lens group. The aperture stop shutter 102 is moved integrally with the second lens group 103 in the optical axis direction. The movement of the first and second lens groups 101 and 102 in the optical axis direction performs variation of magnification (zooming).

Reference numeral 105 denotes a third lens group that is moved in the optical axis direction to perform focusing. Reference numeral 106 denotes an optical low-pass filter that is an optical element to reduce false color and moire in a captured image. Reference numeral 107 denotes an image sensor (image pickup element) constituted by a CMOS sensor and its peripheral circuit. The image sensor 107 has m pixels (light-receiving elements) in a horizontal direction and n pixels in a vertical direction, and primary color mosaic filters are arranged for the pixels in a Bayer arrangement, thereby constituting a two-dimensional single color sensor.

Reference numeral 111 denotes a zoom actuator that rotates a cam barrel (not shown) about the optical axis to move the first and second lens groups 101 and 102 in the optical axis direction for the variation of magnification.

Reference numeral 112 denotes an aperture stop shutter actuator that drives the aperture stop shutter 102 to vary the aperture diameter for light quantity adjustment and performs shutter drive for still image capturing. Reference numeral 114 denotes a focus actuator that moves the third lens group 105 in the optical axis direction for focusing.

Reference numeral 115 denotes an electronic flash including a xenon tube or an LED as a light source. Reference numeral 116 denotes an AF-assist light emitter that projects a mask image including a certain pattern onto the object through a projection lens. The projection of the mask image onto the object can improve AF performance when the object is dark or has a low contrast.

Reference numeral 121 denotes a camera CPU as a controller that governs control of various operations in the camera. The camera CPU 121 includes a computing part, a ROM, a RAM, an A/D converter, a D/A converter and a communication interface circuit. The camera CPU 121 controls the operation of each part in the camera according to computer programs stored in the ROM, and causes a series of image-capturing operations such as AF including focus detection (detection of a focus state) of the image-taking optical system, image capturing, image processing and recording. The camera CPU 121 corresponds to a calculating part.

Reference numeral 122 denotes an electronic flash control circuit that controls lighting of the electronic flash 115. Reference numeral 123 denotes an assist light drive circuit that controls lighting of the AF-assist light emitter 116. Reference numeral 124 denotes an image sensor drive circuit that drives the image sensor 107, A/D-converts pixel signals (image pickup signals) output from the image sensor 107, and transmits the converted digital image pickup signals to the camera CPU 121.

Reference numeral 125 denotes an image processing circuit that performs various image processing on the digital image pickup signals such as γ conversion and color interpolation to produce an image signal, and performs other processes on the image signal such as JPEG compression.

Reference numeral 126 denotes a focus drive circuit that drives the focus actuator 114 on the basis of a focus detection result to move the third lens group 105 in the optical axis direction so as to obtain an in-focus state. Reference numeral 128 denotes an aperture stop shutter drive circuit that drives the aperture stop shutter actuator 112. Reference numeral 129 denotes a zoom drive circuit that drives the zoom actuator 111 in response to a user's zoom operation.

Reference numeral 131 denotes a display device such as an LCD that displays information on an image-capturing mode of the camera, a preview image before image capturing, a captured image for confirmation and an in-focus state obtained by the AF. Reference numeral 132 denotes operation switches including a power switch, a release switch (image-capturing trigger switch), a zoom operation switch and an image-capturing mode selection switch. Reference numeral 133 denotes a detachable flash memory that records captured images.

Figure 2:
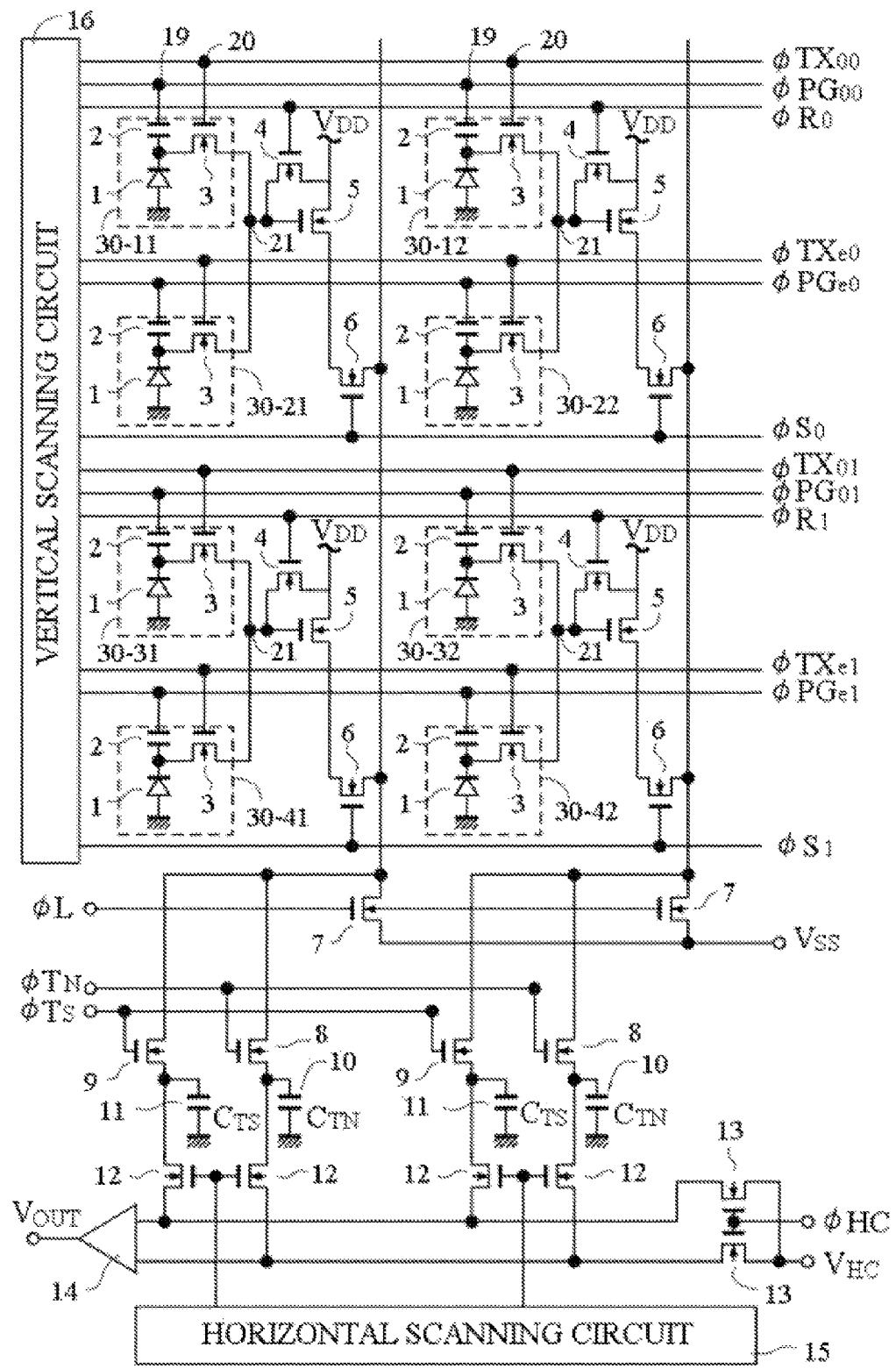
FIG. 2 is a circuit diagram showing the configuration of an image sensor installed in the camera of Example 1.

FIG. 2 shows the circuit configuration of the image sensor 107 in this example. FIG. 2 shows a partial range covering 2×4 pixels in the two-dimensional CMOS sensor. The CMOS sensor has a pixel pitch of 5 µm and 12 million effective pixels (=horizontal 4000 pixels×vertical 3000 pixels) arranged in an effective image pickup area of horizontal 20 mm width× vertical 15 mm height.

In FIG. 2, reference numeral 1 denotes a photoelectric converting part of the CMOS sensor as a photoelectric conversion element, the photoelectric converting part including a MOS transistor gate and a depletion layer under the gate. Reference numeral 2 denotes a photogate, reference numeral 3 denotes a transfer switch MOS transistor, and reference numeral 4 denotes a reset MOS transistor. Reference numeral 5 denotes a source follower amplifier MOS transistor.

Reference numeral 6 denotes a horizontal selector switch MOS transistor, and reference numeral 7 denotes a source follower load MOS transistor. Reference numeral 8 denotes a dark signal transfer MOS transistor, reference numeral 9 denotes an image signal transfer MOS transistor, reference numeral 10 denotes a dark signal storage capacitor $C_{TN}$, and reference numeral 11 denotes an image signal storage capacitor $C_{TS}$. Reference numeral 12 denotes a horizontal transfer MOS transistor, reference numeral 13 denotes a horizontal output line reset MOS transistor, reference numeral 14 denotes a differential output amplifier, reference numeral 15 denotes a horizontal scanning circuit, and reference numeral 16 denotes a vertical scanning circuit.

Figure 3:
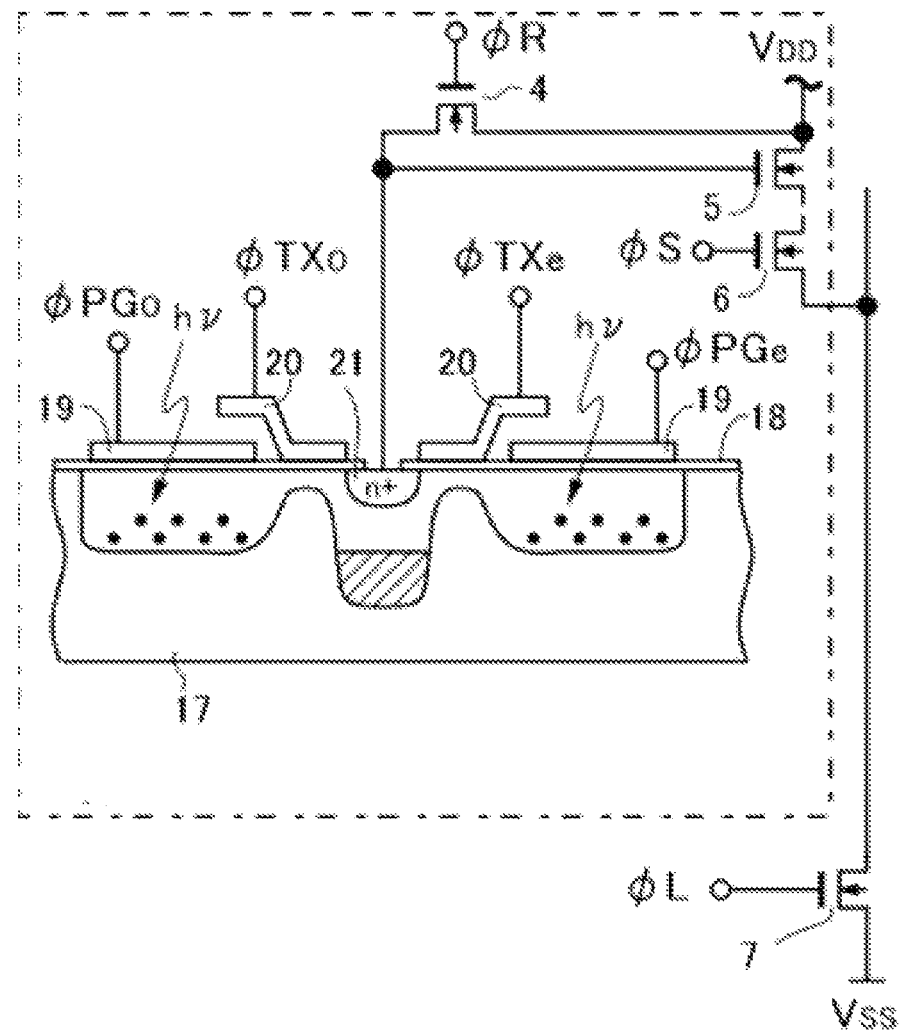
FIG. 3 is a cross-sectional view of a pixel part of the image sensor.

FIG. 3 shows the sectional structure of a pixel part of the image sensor 107. In FIG. 3, reference numeral 17 denotes a p-type well, reference numeral 18 denotes a gate oxide film, reference numeral 19 denotes a first polysilicon layer, reference numeral 20 denotes a second polysilicon layer, and reference numeral 21 denotes an n+ floating diffusion (FD) portion. The FD portion 21 is connected with two photoelectric converting parts via the two transfer switch MOS transistors 3. In FIG. 3, drains of the two transfer switch MOS transistors 3 and the FD portion 21 are integrated for miniaturization and improvement of sensitivity through capacitance reduction of the FD portion 21. The FD portion 21 may be connected to the drains of the two transfer switch MOS transistors 3 by aluminum (Al) wiring.

Figure 4:
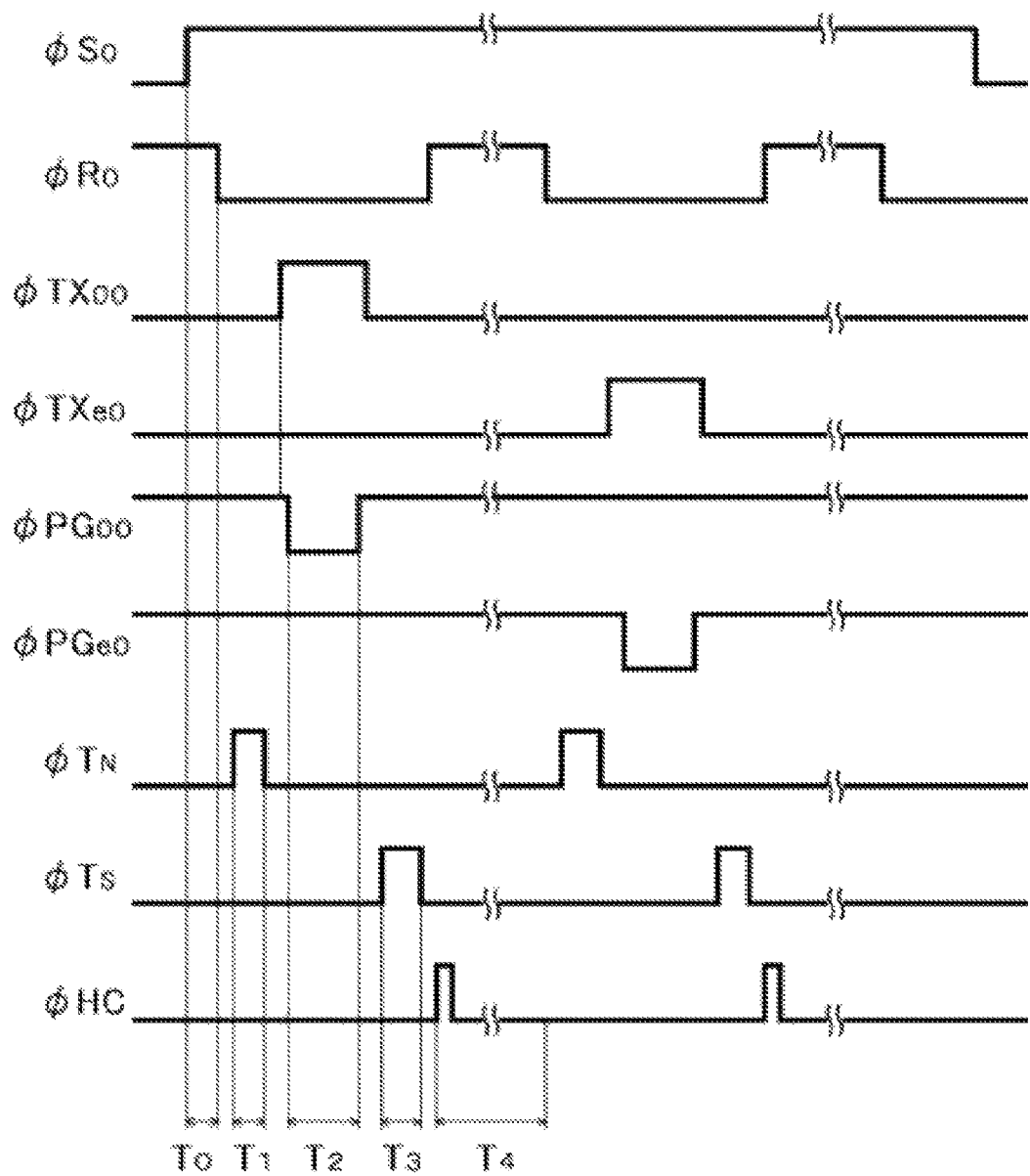
FIG. 4 is a drive timing chart for the image sensor.

Next, description will be made of the operation of the image sensor 107 with reference to a timing chart shown in FIG. 4. This timing chart indicates a case where the image sensor 107 is operated in a progressive scan method.

First, in response to a timing output from the vertical scanning circuit 16, a control pulse φL is set to "High" to reset a vertical output line. Moreover, control pulses φ$R_0$, φ$PG_{00}$ and φ$PG_{e0}$ are set to "High" to turn on the reset MOS transistor 4 and to set the first polysilicon layer 19 of the photogate 2 to "High".

At time $T_0$, a control pulse φ$S_0$ is set to "High" to turn on the horizontal selector switch MOS transistor 6 so as to select pixels in the first and second lines.

Next, the control pulse φ$R_0$ is set to "Low" to stop reset of the FD portion 21 such that the FD portion 21 is brought into a floating state and thereby a gate and a source of the source follower amplifier MOS transistor 5 are brought into a through state. Subsequently, at time $T_1$, a control pulse φ$T_N$ is set to "High" to cause the FD portion 21 to output a dark voltage of the FD portion 21 to the storage capacitor $C_{TN}$ 10 by a source follower operation.

Next, in order to cause the pixels in the first line to perform photoelectric conversion output, a control pulse φ$TX_{00}$ for the first line is set to "High" to bring the transfer switch MOS transistor 3 into conduction, and then at time $T_2$ the control pulse φ$PG_{00}$ is set to "Low". It is desirable to establish a voltage relationship at this time such that a potential well being spread below the photogate 2 is shallowed to achieve complete transfer of light-generating carriers to the FD portion 21. Thus, as long as the complete transfer is possible, a fixed potential may be used instead of the control pulse φ$T_X$.

Charge transfer from the photoelectric converting part 1 of the photodiode to the FD portion 21 at the time $T_2$ causes the potential of the FD portion 21 to be changed in response to light. Since the source follower amplifier MOS transistor 5 is in the floating state at this time, a control pulse φ$T_S$ is set to "High" at time $T_3$ to cause the FD portion 21 to output its potential to the storage capacitor $C_{TS}$ 11. At this point of time, dark signals and image signals of the pixels in the first line are respectively stored in the storage capacitors $C_{TN}$ 10 and $C_{TS}$ 11.

At time $T_4$, a control pulse φHC is temporarily set to "High" to bring the horizontal output line reset MOS transistor 13 into conduction so as to reset a horizontal output line. Thus, the dark signals and the image signals of the pixels are output to the horizontal output line in a horizontal transfer period in response to a scan timing signal of the horizontal scanning circuit 15. At this time, acquiring a differential output $V_{OUT}$ using the differential amplifier 14 for the storage capacitors $C_{TN}$ 10 and $C_{TS}$ 11 provides a signal with a good signal-to-noise (S/N) ratio, from which random pixel noise and fixed-pattern noise are removed.

Moreover, photo charges of pixels 30-12 and 30-22 are stored in their respective storage capacitors $C_{TN}$ 10 and $C_{TS}$ 11 simultaneously with those of pixels 30-11 and 30-21. Reading thereof to the horizontal output line is performed with a delay of a timing pulse from the horizontal scanning circuit 15 by a time corresponding to one pixel, and the read photo charges are output from the differential amplifier 14.

Although this example shows the configuration that provides the differential output $V_{OUT}$ inside a chip, an external CDS (Correlated Double Sampling) circuit, which is a conventional circuit, may be used to obtain a similar effect to that of this example.

After the image signal is output to the storage capacitor $C_{TS}$ 11, the control pulse $\phi R_0$ is set to "High" to bring the reset MOS transistor 4 into conduction so as to reset the FD portion 21 to a power supply voltage $V_{DD}$. When the horizontal charge transfer from the first line is completed, charge reading from the pixels in the second line is performed.

In the reading from the second line, a control pulse $\phi TX_{e0}$ and a control pulse $\phi PG_{e0}$ are driven, as in the case of the first line described above, and the control pulses $\phi T_N$ and $\phi T_S$ are respectively set to "High" such that a dark signal and an image signal are respectively stored in the storage capacitors $C_{TN}$ 10 and $C_{TS}$ 11.

The above drive process allows independent reading from the first and second lines. Subsequently, similarly operating the vertical scanning circuit 16 to perform reading from a (2n+1)-th and (2n+2)-th lines (n=1, 2, . . . ) enables progressive scan.

Specifically, when n=1, a control pulse $\phi S_1$ is first set to "High", then a control pulse $\phi R_1$ is set to "Low". Subsequently, control pulses $\phi T_N$ and $\phi TX_{01}$ are set to "High", a control pulse $\phi PG_{01}$ is set to "Low", the control pulse $\phi T_S$ is set to "High", and the control pulse $\phi HC$ is temporarily set to "High" to read dark signals and image signals from the pixels 30-31 and 30-32.

Next, control pulses $\phi TX_{e1}$ and $\phi PG_{e1}$ are applied similarly to the above description to read dark signals and image signals from pixels 30-41 and 30-42.

Next, description will be made of the structure of an image pickup pixel and a focus detection pixel arranged on the image sensor 107 with reference to FIGS. 5A, 5B, 6A, 6B, 7A and 7B. The image sensor 107 in this example employs the Bayer arrangement in which 4(=2×2) pixels that include two pixels having a spectral sensitivity to G (green) and being located at two diagonal places and two pixels respectively having spectral sensitivities to R (red) and B (blue) and being located at other two places. The focus detection pixels are dispersedly placed in the image pickup pixels arranged in the Bayer arrangement.

Figure 5A:
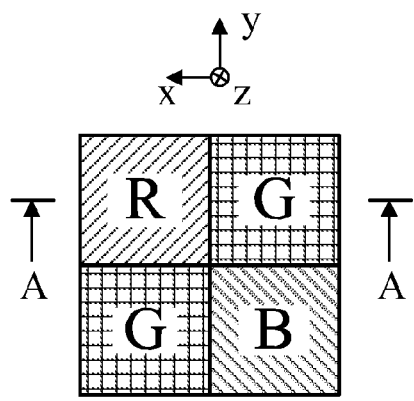
FIGS. 5A and 5B are a front view and a cross-sectional view of image-pickup pixels in the image sensor.
Figure 5B:
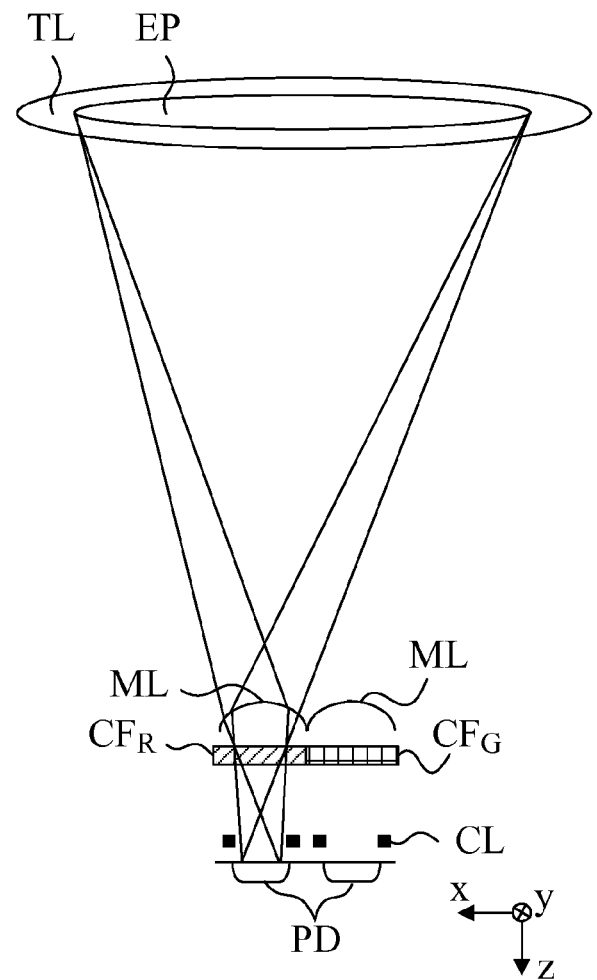

FIGS. 5A and 5B respectively show a front view and a cross-sectional view of 2×2 image pickup pixels located at a center of the image sensor 107. As described above, the two G-pixels are arranged at the two diagonal places and the R- and B-pixels are arranged at the other two diagonal places.

FIG. 5B shows a cross section cut along a line A-A in FIG. 5A. Reference character ML denotes an on-chip micro-lens placed at a most-front layer of each pixel. Reference character $CF_R$ denotes an R (red)-color filter, and reference character $CF_G$ denotes a G (green)-color filter. Reference character PD denotes the photoelectric conversion part of the CMOS sensor described using FIG. 3. Reference character CL denotes a wiring layer in which signal lines to transmit various signals in the CMOS sensor are formed. Reference character TL denotes the image-taking optical system.

The on-chip micro-lens ML and the photoelectric conversion part PD of the image pickup pixel are configured so as to take in a light flux that has passed through the image-taking optical system TL as effectively as possible. In other words, an exit pupil EP of the image-taking optical system TL and the photoelectric conversion part PD are arranged in a conjugate relationship by the micro-lens ML, and a large effective area of the photoelectric conversion part PD is set.

Although FIG. 5B shows the structure of the R-pixel, the G- and B (Blue)-pixel have the same structure. Therefore, the exit pupil EP corresponding to the RGB image pickup pixels has a large diameter in order to efficiently take in the light flux from the object, which improves the S/N ratio of the image signal.

Figures 6A, 6B:
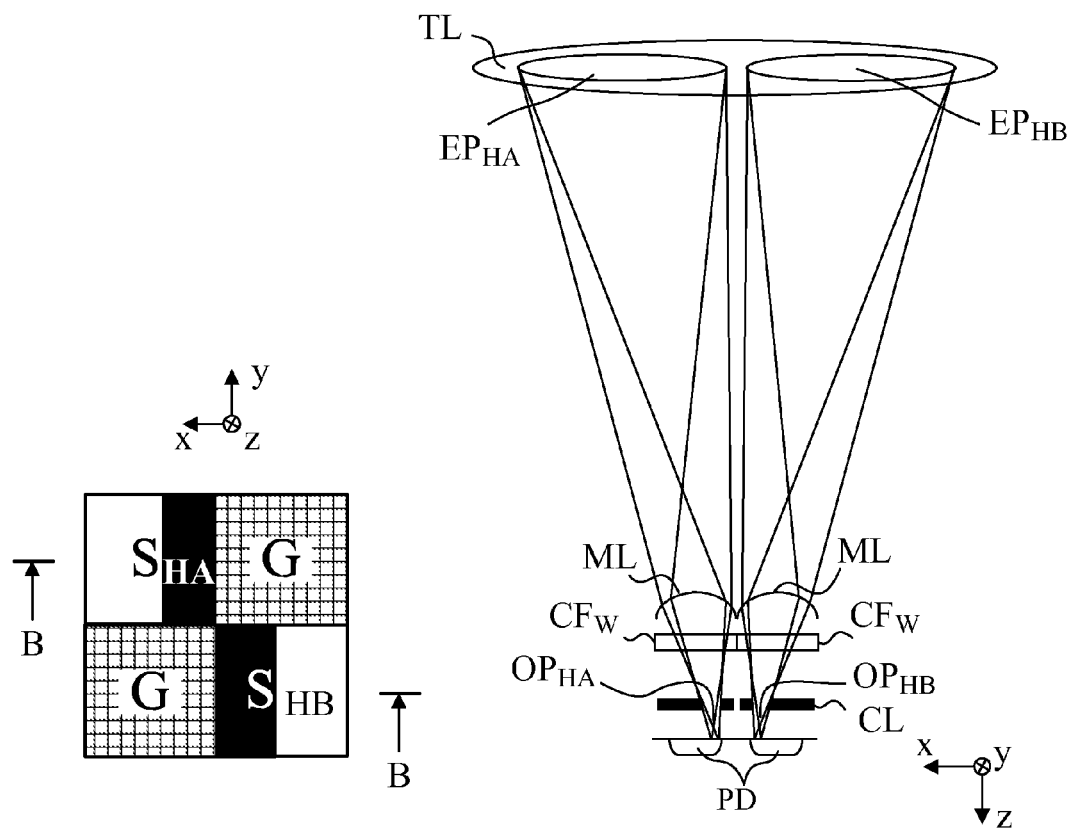
FIGS. 6A and 6B are a front view and a cross-sectional view of focus detection pixels for horizontal pupil division in the image sensor in Example 1.

FIGS. 6A and 6B respectively show a front view and a cross-sectional view of 2×2 pixels including focus detection pixels, the 2×2 pixels being located at the center of the image sensor 107 and the focus detection pixels dividing a pupil of the image-taking optical system TL in an x-direction as a pupil division direction.

In the image pickup signal, an output from the G-pixel is a main component of luminance information. Since a human image recognition characteristic is sensitive to the luminance information, defect of the G-pixel easily causes humans to recognize image quality degradation. On the other hand, though the R- and B pixels provide color information, the humans are insensitive to the color information, and therefore defect of the R- and B pixels hardly causes the humans to recognize the image quality degradation.

Thus, this example leaves, in the 4 (=2×2) pixels, two G-pixels as the image pickup pixels, and places the focus detection pixels at positions for the R- and B-pixels at a certain rate. FIG. 6A shows the focus detection pixels by $S_{HA}$ and $S_{HB}$.

A plurality of the focus detection pixels $S_{HA}$ dispersedly arranged on the image sensor 107 corresponds to "first pixels" or "a first pixel group", and a plurality of the focus detection pixels $S_{HB}$ dispersedly arranged thereon corresponds to "second pixels" or a "second pixel group".

FIG. 6B shows a cross section cut along a line B-B in FIG. 6A. The micro-lens ML and the photoelectric conversion part PD have same structures as those in the image pickup pixel shown in FIG. 5B.

In this example, since signals from the focus detection pixels are not used for producing a captured image, a transparent film (white film) $CF_W$ is placed instead of a color separation color filter.

Moreover, since the focus detection pixel divides the pupil in a +x-direction, an aperture of the wiring layer CL is displaced with respect to a centerline of the micro-lens ML in the x-direction. Specifically, since an aperture $OP_{HA}$ of the focus detection pixel $S_{HA}$ is displaced in a −x-direction, and thus the photoelectric conversion part PD of the focus detection pixel $S_{HA}$ receives a light flux passing through a left side (+x side) exit pupil area (first pupil area) $EP_{HA}$ of the image-taking optical system TL.

On the other hand, since an aperture $OP_{HB}$ of the focus detection pixel $S_{HB}$ is displaced in a +x-direction, and thus the photoelectric conversion part PD of the focus detection pixel $S_{HB}$ receives a light flux passing through a right side (−x side) exit pupil area (second pupil area) $EP_{HB}$ of the image-taking optical system TL.

An object image obtained by the plural focus detection pixels $S_{HA}$ (first pixels) regularly arranged in the x-direction is referred to an A-image (first image). Moreover, an object image obtained by the plural focus detection pixels $S_{HB}$ (second pixels) regularly arranged in the x-direction is referred to a B-image (second image). Detecting a relative positional relationship (that is, a phase difference) between the A- and B-images enables calculation of a defocus amount of the image-taking optical system TL for the object on the basis of the phase difference.

Although the focus detection pixels $S_{HA}$ and $S_{HB}$ are capable of performing the focus detection for an object having a luminance distribution in the x-direction of an image-capturing frame, such as a line extending in a y-direction, they are incapable of performing the focus detection for an object having a luminance distribution in the y-direction, such as a line extending in the x-direction. Thus, this example is also provided with focus detection pixels dividing the pupil in the y-direction of the image-taking optical system TL in order to be capable of also performing the focus detection for the latter object.

FIGS. 7A and 7B respectively show a front view and a cross-sectional view of 2×2 pixels including the focus detection pixels, the 2×2 pixels being located at the center of the image sensor 107 and the focus detection pixels dividing the pupil of the image-taking optical system TL in the y-direction as a pupil division direction. As well as in FIG. 7A, this example leaves, in the 4 (=2×2) pixels, two G-pixels as the image pickup pixels, and places the focus detection pixels at positions for the R- and B-pixels at a certain rate.

FIG. 7A shows the focus detection pixels by $S_{VC}$ and $S_{VD}$. A plurality of the focus detection pixels $S_{VC}$ dispersedly arranged on the image sensor 107 corresponds to "first pixels" or a "first pixel group", and a plurality of the focus detection pixels $S_{VD}$ dispersedly arranged thereon corresponds to "second pixels" or a "second pixel group".

The FIG. 7B shows a cross section cut along a line C-C in FIG. 7A. Although the pixel shown in FIG. 7B divides the pupil in the y-direction, the structure thereof is same as that of the pixel shown in FIG. 6B, which divides the pupil in the x-direction.

Since the focus detection pixel divides the pupil in the y-direction, an aperture of the wiring layer CL is displaced with respect to a centerline of the micro-lens ML in the y-direction. Specifically, since an aperture $OP_{VC}$ of the focus detection pixel $S_{VC}$ is displaced in a −y-direction, and thus the photoelectric conversion part PD of the focus detection pixel $S_{VC}$ receives a light flux passing through an upper side (+y side) exit pupil area (first pupil area) $EP_{VC}$ of the image-taking optical system TL.

Moreover, since an aperture $OP_{VD}$ of the focus detection pixel $S_{VD}$ is displaced in a +y-direction, and thus the photoelectric conversion part PD of the focus detection pixel $S_{VD}$ receives a light flux passing through a lower side (−y side) exit pupil area (second pupil area) $EP_{VD}$ of the image-taking optical system TL.

An object image obtained by the plural focus detection pixels $S_{VC}$ (first pixels) regularly arranged in the y-direction is referred to a C-image. Moreover, an object image obtained by the plural focus detection pixels $S_{VD}$ (second pixels) regularly arranged in the y-direction is referred to a D-image. Detecting a relative positional relationship (that is, a phase difference) between the C- and D-images enables calculation of a defocus amount of the image-taking optical system TL for the object on the basis of the phase difference.

Figure 8:
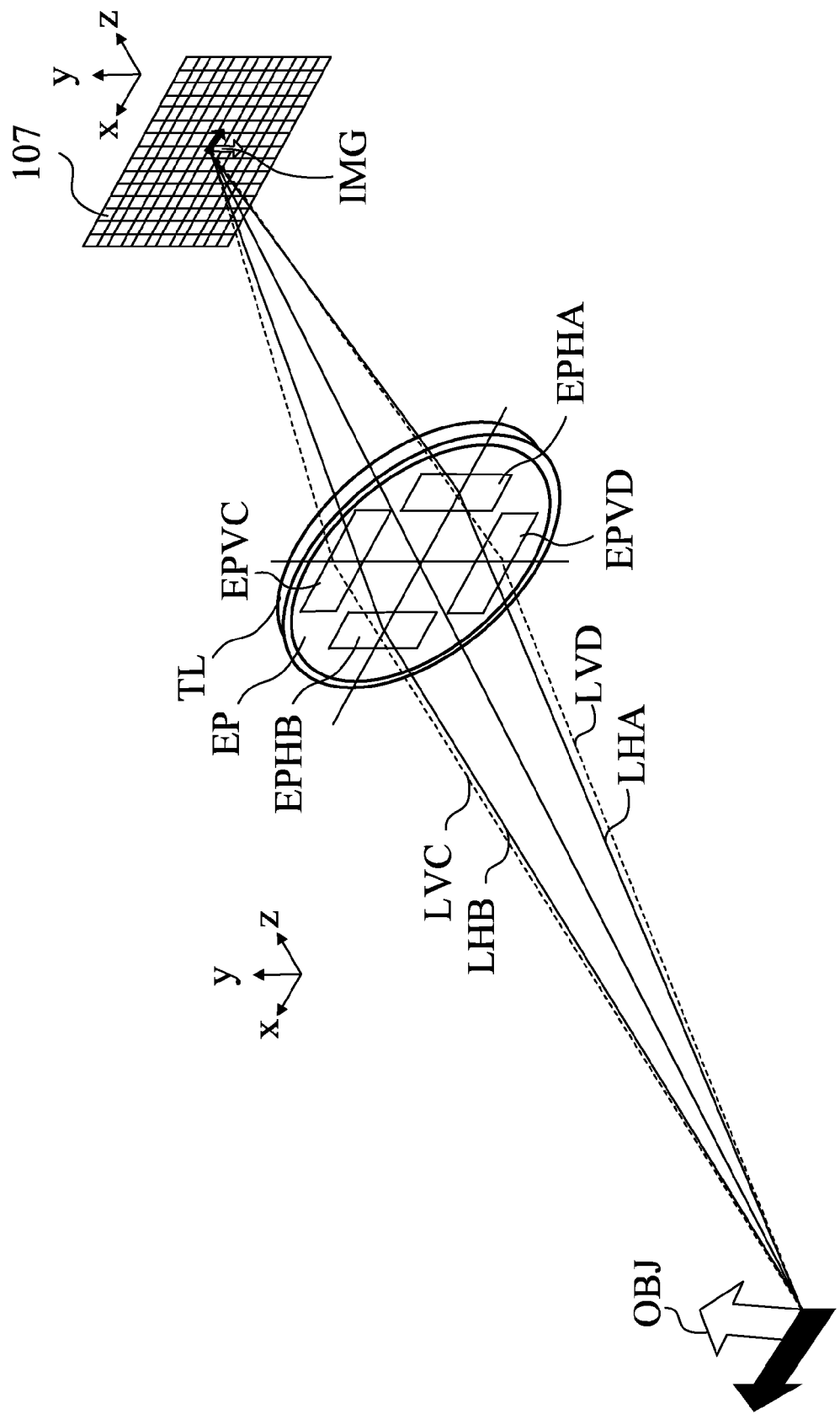
FIG. 8 shows the pupil division by the image sensor.

FIG. 8 shows pupil division by the image sensor 107 in this example. Reference character TL denotes the image-taking optical system, reference number 107 denotes the image sensor, reference character OBJ denotes an object, and reference character IMG denotes an object image.

The image pickup pixel receives the light flux that has passed through the entire area of the exit pupil EP of the image-taking optical system TL. On the other hand, the focus detection pixel $S_{HA}$ shown in FIG. 6A receives the light flux that has passed through the +x side pupil area $EP_{HA}$ of the exit pupil EP. Similarly, the focus detection pixel $S_{HB}$, $S_{VC}$ and $S_{VD}$ receive the light fluxes that have passed through the exit pupil areas $EP_{HB}$, $EP_{VC}$ and $EP_{VD}$, respectively.

Dispersedly arranging the focus detection pixels over the entire area of the image sensor 107 enables the focus detection over the entire effective image pickup area.

Figure 9:
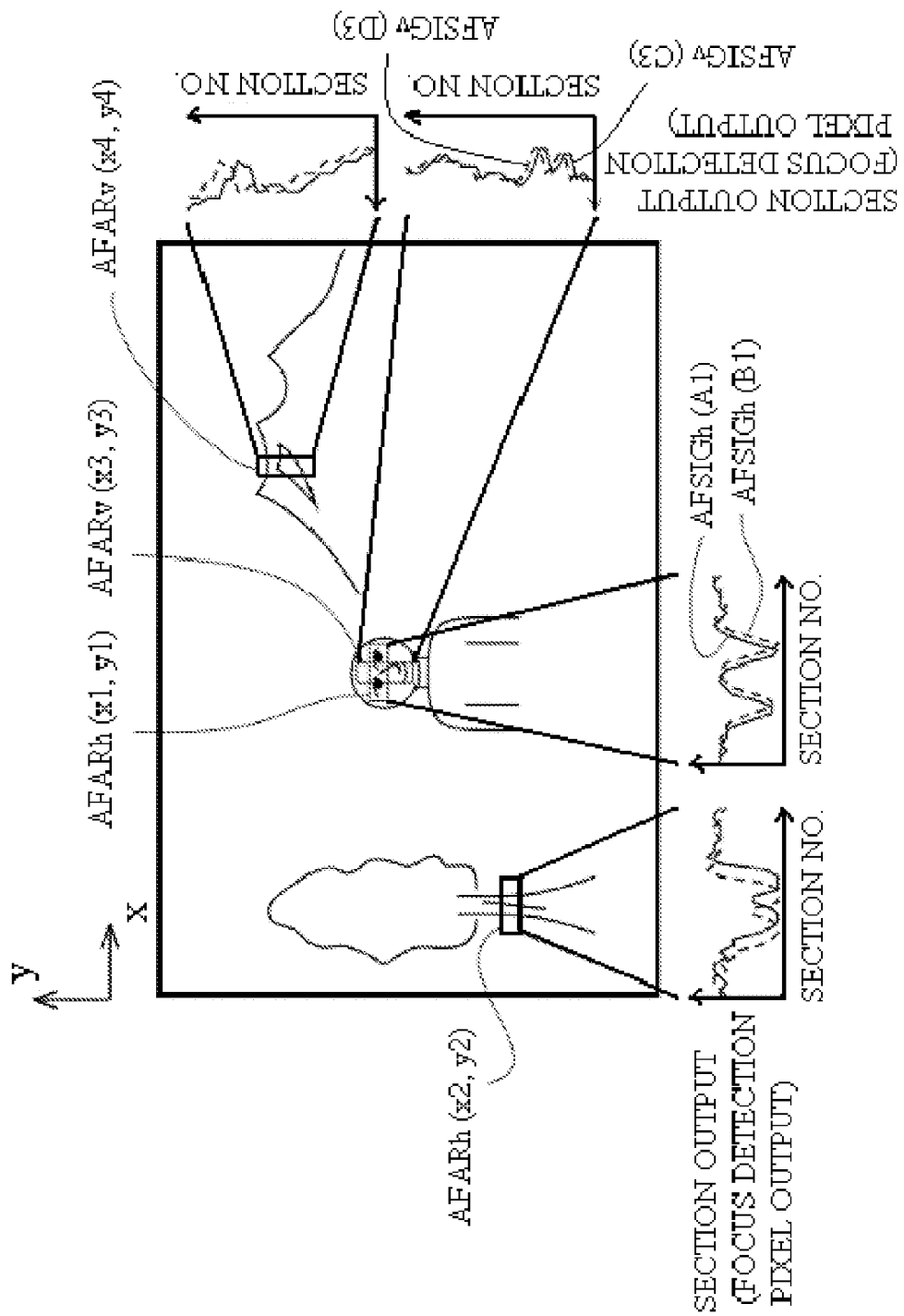
FIG. 9 shows an acquired image when performing focus detection and focus detection areas in the camera of Example 1.

FIG. 9 shows a relationship between an object image acquired for the focus detection and the focus detection areas. In FIG. 9, the object image formed on the effective image pickup area of the image sensor 107 (image-capturing frame) includes an image of a person located at its center, an image of a tree located on the left side at a close distance, and an image of a mountain located on the right side at a far distance.

This example arranges the focus detection pixels $S_{HA}$ and $S_{HB}$ that divide the pupil in the x-direction and the focus detection pixels $S_{VC}$ and $S_{VD}$ that divide the pupil in the y-direction over the entire effective image pickup area in an even distribution (density). Thus, this example uses pixel signals obtained from the focus detection pixels $S_{HA}$ and $S_{HB}$ to detect the phase difference between the A- and B-images in the x-direction, and uses pixel signals obtained from the focus detection pixels $S_{VC}$ and $S_{VD}$ to detect the phase difference between the C- and D-images in the y-direction.

This makes it possible to set the focus detection areas for detecting the phase differences in the x- and y-directions at arbitrary positions in the effective image pickup area.

In FIG. 9, a face of the person exists at a center of the image-capturing frame. In response to detection of a region including the face by a known face recognition technique, a focus detection area AFARh(x1, y1) for the phase difference detection in the x-direction and a focus detection area AFARv(x3, y3) for the phase difference detection in the y-direction are set centering around the face region. The subscript h represents the x-direction, the subscript v represents the y-direction, and (x1, y1) and (x3, y3) respectively represent coordinates at upper left corners of the focus detection areas.

The focus detection area AFARh(x1, y1) includes 30 sections. The pixel signals obtained from the focus detection pixels $S_{HA}$ respectively included in the 30 sections are connected with each other to form an A-image signal (first image signal) AFSIGh(A1) for the phase difference detection. Similarly, the pixel signals obtained from the focus detection pixels $S_{HB}$ respectively included in the 30 sections are connected with each other to form a B-image signal (second image signal) AFSIGh(B1) for the phase difference detection.

Moreover, calculating the phase difference, which is a relative displacement amount, of the A-image signal AFSIGh (A1) and the B-image signal AFSIGh(B1) in the x-direction by correlation calculation enables acquisition of the defocus amount of the image-taking optical system on the basis of the phase difference.

Similarly, in the focus detection area AFARv(x3, y3), the pixel signals obtained from the focus detection pixels $S_{VC}$ and $S_{VD}$ included in 30 sections are respectively connected with each other to form a C-image signal (first image signal) AFSIGv(C3) and a D-image signal AFSIGv(D3) for the phase difference detection. And, calculating the phase difference, which is a relative displacement amount, of the C-image signal AFSIGv(C3) and the D-image signal AFSIGv(D3) in the y-direction by correlation calculation enables acquisition of the defocus amount of the image-taking optical system on the basis of the phase difference.

This example compares the defocus amounts in the x- and y-directions thus obtained based on the phase differences with each other, and performs AF by using one, having higher reliability, of the compared defocus amounts.

On the other hand, since a trunk of the tree located on the left side of the image-capturing frame extends in the y-direction and has a luminance distribution in the x-direction, the trunk is determined to be an appropriate object for the phase difference detection in the x-direction. In this case, a focus detection area AFARh (x2, y2) for the phase difference detection in the x-direction is set.

Moreover, since a ridge line of the mountain located on the right side of the image-capturing frame extends in the x-direction and has a luminance distribution in the y-direction, the ridge line is determined to be an appropriate object for the phase difference detection in the y-direction. In this case, a focus detection area AFARv (x4, y4) for the phase difference detection in the y-direction is set.

As described above, this example is capable of setting the focus detection areas for the phase difference detection in the x- and y-directions at arbitrarily positions in the image-capturing frame, and therefore this example can perform focus detection even if the position of the object image and the luminance distribution thereof are various.

The principle of the focus detection is same in the x- and y-directions except the direction is different, and thus description will hereinafter be made of the focus detection in the x-direction, and that in the y-direction will be omitted.

FIGS. 10A and 10B show incident angle characteristics of the focus detection pixels located at the center of the image sensor 107. FIG. 10A shows the characteristic of the focus detection pixel $S_{HA}$, and FIG. 10B shows the characteristic of focus detection pixel $S_{HB}$. A θx-axis and a θy-axis in FIGS. 10A and 10B respectively show incident angles on the pixel in the x-direction and the y-direction. In FIGS. 10A and 10B, a darker color indicates a higher light-receiving intensity.

FIG. 6A has showed the exit pupil area $EP_{HA}$ through which the light flux received by the focus detection pixel $S_{HA}$ passes and the exit pupil area $EP_{HB}$ through which the light flux received by the focus detection pixel $S_{HB}$ passes, separately from each other. However, in reality as shown in FIGS. 10A and 10B, the exit pupil areas through which the light fluxes received by the focus detection pixels $S_{HA}$ and $S_{HB}$ pass partially overlap each other because of an influence of diffraction caused by the apertures $OP_{HA}$ and $OP_{HB}$ and an improvement of the S/N ratio.

FIG. 11 one-dimensionally shows the incident angle characteristics of the focus detection pixels $S_{HA}$ and $S_{HB}$. In FIG. 11, a horizontal axis shows the incident angle, a vertical axis shows the incident angle characteristic obtained by integrating light-receiving sensitivity in the θy-direction in FIGS. 10A and 10B, and an origin shows a position of the optical axis. As shown in FIG. 11, at the center of the image sensor 107, the incident angle characteristics of the focus detection pixels $S_{HA}$ and $S_{HB}$ are symmetric with each other with respect to the optical axis.

Description will be made of light flux vignetting with reference to FIGS. 12A and 12B. FIG. 12A shows a light flux entering the pixel located at the center of the image sensor 107, and FIG. 12B shows a light flux entering a pixel at a certain image height from the center of the image sensor 107. The light flux limited by light-limiting members such as lens holding members holding lenses and the aperture stop, which constitute the image-taking optical system. Description will herein be made of a case where two light-limiting members limiting the light flux at the entire image heights exist.

Reference characters Iw1 and Iw2 denote apertures (windows) of the light-limiting members through which the light fluxes pass. Reference character Me denotes a pupil surface set depending on the configuration of the micro-lens ML.

In FIG. 12A, reference characters L1rc and L1lc show an outer circumference of the light flux exiting from the window Iw1, L1rc representing a right edge of the light flux and L1lc representing a left edge of the light flux. Reference characters L2rc and L2lc show an outer circumference of the light flux exiting from the window Iw2 and being projected onto the pupil surface Me of the micro-lens ML, L2rc representing a right edge of the light flux and L2lc representing a left edge of the light flux.

As shown in FIG. 12A, a pupil area on the pupil surface Me for the light flux entering the focus detection pixel located at the center of the image sensor 107 is shown by the light flux having the outer circumference L2lc and L2rc, in other words, by an arrow Area1.

Next, description will be made of the vignetting of the light flux entering the pixel at the certain image height from the center of the image sensor 107 with reference to FIG. 12B. Reference characters L1rh and L1lh show an outer circumference of the light flux exiting from the window Iw1, L1rh representing a right edge of the light flux and L1lh representing a left edge of the light flux. Reference characters L2rh and L2lh show an outer circumference of the light flux exiting from the window Iw2 and being projected onto the pupil surface Me of the micro-lens ML, L2rh representing a right edge of the light flux and L2lh representing a left edge of the light flux.

As shown in FIG. 12B, a pupil area on the pupil surface Me for the light flux entering the focus detection pixel located at the certain image height from the center of the image sensor 107 is shown by the light flux having the outer circumference L1lh and L2rh, in other words, by an arrow Area2.

FIGS. 13A and 13B show the pupil areas on the pupil surface Me. FIG. 13A shows the pupil area of the pixel located at the center of the image sensor 107, and FIG. 13B shows the pupil area of the pixel located at the certain image height from the center of the image sensor 107. Since the light flux limited only by the window Iw2 enters the center pixel of the image sensor 107 as described in FIG. 12A, a shape of the window Iw2 is projected onto the pupil area Area1 as it is. The window limiting the light flux has a circular shape, and therefore the pupil area Area1 also has a circular shape. On the other hand, since the light flux limited by the windows Iw1 and Iw2 enters the pixel located at the certain image height from the center of the image sensor 107, the pupil area Area2 has a shape shown in FIG. 13B.

Figure 14A:
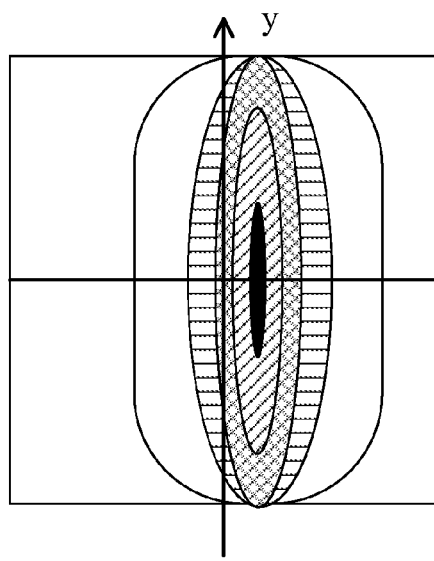
FIGS. 14A and 14B show pupil intensity distributions of the focus detection pixels in Example 1.
Figure 14B:
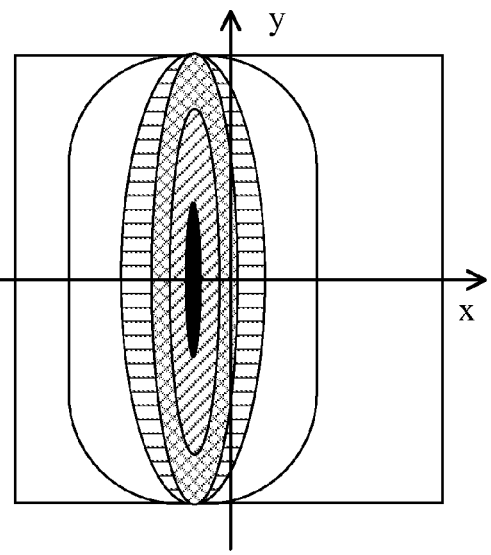

FIGS. 14A and 14B show pupil intensity distributions of the focus detection pixel. These pupil intensity distributions are equivalent to the incident angle characteristics of the focus detection pixels located at the center of the image sensor 107 shown in FIGS. 10A and 10B and projected onto the pupil surface Me of the micro-lens ML. A vertical axis and a horizontal axis of FIG. 14 show x and y coordinates on the pupil surface Me. The focus detection pixel located at the certain image height from the center of the image sensor 107 has same pupil intensity distributions as those shown in FIGS. 10A and 10B. This is because the micro-lens ML for the focus detection pixel located at the certain image height from the center of the image sensor 107 is formed to be decentered such that an optical axis center thereof passes through a center of the pupil surface Me of the micro-lens ML.

Figure 15A:
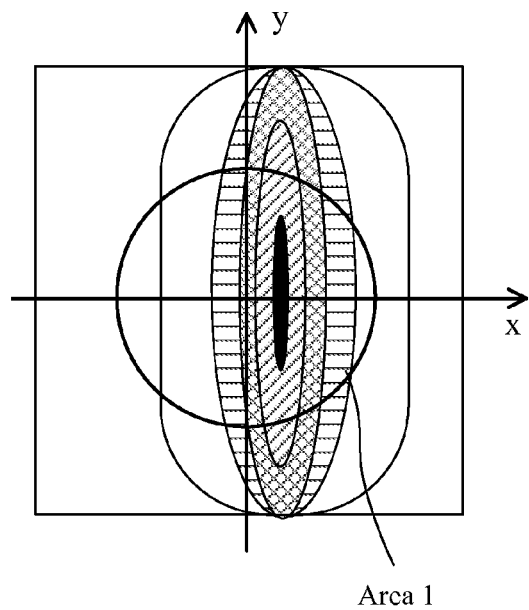
FIGS. 15A and 15B show vignetting on the pupil surface of the central focus detection pixel in Example 1.
Figure 15B:
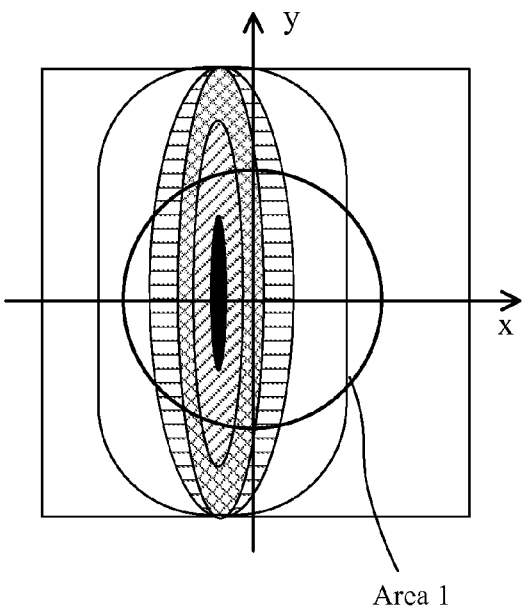

FIGS. 15A and 15B show the vignetting on the pupil surface Me of the micro-lens ML, for the focus detection pixel located at the center of the image sensor 107. FIG. 15A shows the vignetting for the focus detection pixel $S_{HA}$, and FIG. 15B shows the vignetting for the focus detection pixel $S_{HB}$. FIGS. 15A and 15B correspond to superimposed figures of FIG. 13A with FIGS. 14A and 14B. The light fluxes that have passed through inside a shape shown by Area1 enter the focus detection pixels $S_{HA}$ and $S_{HB}$.

Figure 16:
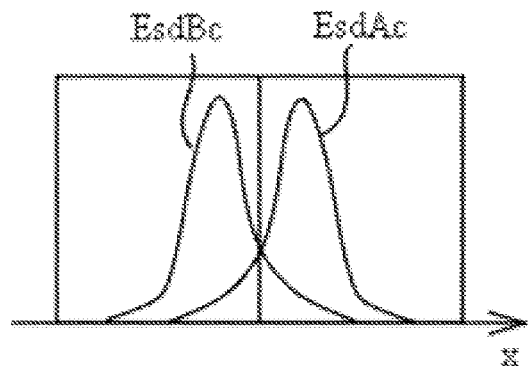
FIG. 16 two-dimensionally shows a pupil intensity distribution of an entering light flux on the pupil surface of the central focus detection pixel in Example 1.

FIG. 16 shows a one-dimensional pupil intensity distribution of the entering light flux on the pupil surface Me of the micro-lens ML for the focus detection pixel located at the center of the image sensor 107, which is projected onto the x-axis. A horizontal axis shows coordinates in the x-direction on the pupil surface Me, and a vertical axis shows intensities at the respective coordinates. The intensities at the respective coordinates are obtained by integrating the pupil intensities in the y-direction in FIGS. 15A and 15B. The pupil intensity distributions of the incident light flux on the pupil surface Me of the micro-lens ML for the focus detection pixels $S_{HA}$ and $S_{HB}$ are respectively shown by EsdAc and EsdBc.

As shown in FIG. 16, shapes of the vignetting on the pupil surface Me of the micro-lens ML for the focus detection pixels $S_{HA}$ and $S_{HB}$ and the pupil intensity distributions thereinside are horizontally symmetric with each other. Therefore, the pupil intensity distributions of the entering light flux on the pupil surface Me of the micro-lens ML for the focus detection pixels $S_{HA}$ and $S_{HB}$ are also horizontally symmetric with each other.

Figures 17A, 17B:
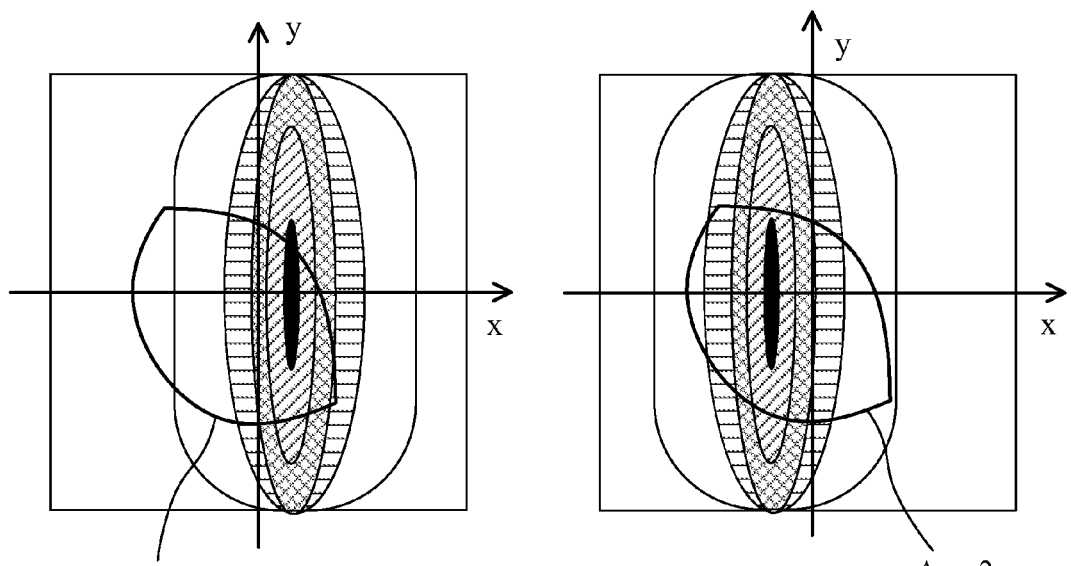
FIGS. 17A and 17B show light flux vignetting on the pupil surface of a pixel with a certain image height from a center of the image sensor in Example 1.

FIGS. 17A and 17B show the vignetting on the pupil surface Me of the micro-lens ML for the focus detection pixel located at the certain image height from the center of the image sensor 107. FIG. 17A shows the vignetting for the focus detection pixel $S_{HA}$, and FIG. 17B shows the vignetting for the focus detection pixel $S_{HB}$. FIGS. 17A and 17B correspond to superimposed figures of FIG. 13B with FIGS. 14A and 14B. The light fluxes that have passed through inside a shape shown by Area2 enter the focus detection pixels $S_{HA}$ and $S_{HB}$.

Figure 18:
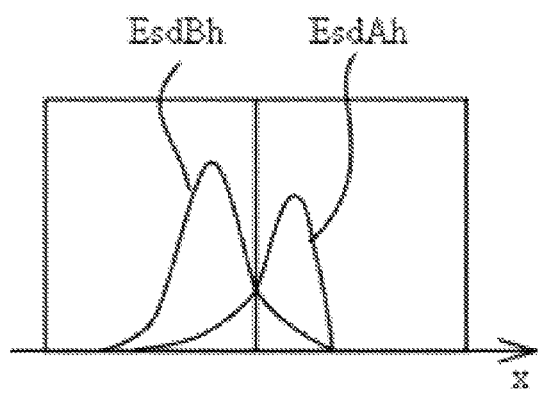
FIG. 18 two-dimensionally shows a pupil intensity distribution of the entering light flux on the pupil surface of the pixel with the certain image height from the center of the image sensor in Example 1.

FIG. 18 shows a one-dimensional pupil intensity distribution of the entering light flux on the pupil surface Me of the micro-lens ML for the focus detection pixel located at the certain image height from the center of the image sensor 107, which is projected onto a coordinate axis in a direction of the pupil division. A horizontal axis shows coordinates in the pupil division direction on the pupil surface Me, and a vertical axis shows the intensities at the respective coordinates. The pupil intensity distributions at the respective coordinates are obtained by integrating the pupil intensity distributions in FIGS. 17A and 17B in a direction orthogonal to the pupil division direction. In FIG. 18, the pupil intensity distributions of the entering light flux on the pupil surface Me for the focus detection pixels $S_{HA}$ and $S_{HB}$ are respectively shown by EsdAh and EsdBh. Shapes of the pupil intensity distributions on the pupil surface Me of the micro-lens ML for the focus detection pixels $S_{HA}$ and $S_{HB}$ are horizontally symmetric with each other. However, the pupil intensity distributions EsdAh and EsdBh of the incident light flux on the pupil surface Me of the micro-lens ML for the focus detection pixels $S_{HA}$ and $S_{HB}$ are horizontally asymmetric with each other.

Next, description will be made of a method for detecting the phase difference between the A- and B-images (A- and B-image signals) and the defocus amount of the image-taking optical system.

When a light quantity distribution of an object is represented by $f_2(x, y)$, and a light quantity distribution of an object image that is an optical image of the object is represented by $g_2(x, y)$, the following relationship using convolution is established:

$$g_2(x, y) = \int_{-\infty}^{\infty}\int_{-\infty}^{\infty} dx'\, dy'\, h_2(x-x', y-y'; d) f_2(x', y'). \tag{1}$$

where h2 (x, y; d) represents a transfer function showing a state of deterioration of an object image caused in an image pickup system constituted by the image-taking optical system and an image producing system according to a defocus amount d, which is referred to as a point spread function (PSF). It is necessary for knowing the state of paired object images (paired image signals) being used in the focus detection to know the point spread function.

This example performs the focus detection by a method called a phase difference detection method. The phase difference detection method focuses on a one-dimensional direction of the paired image signals to detect the phase difference therebetween, which makes it possible to evaluate the image pickup system relating to the focus detection by using a line spread function that is a one-dimensional function, instead of the point spread function.

When the light quantity distribution of the object is represented by f(x), the light quantity distribution of the A-image that is one of the paired object image is represented by $g_A(x)$, and the light quantity distribution of the B-image that is the other of the paired object image is represented by $g_B(x)$, the following relationship is established by using a line spread function $h_A(x; d)$ of the focus detection pixel $S_{HA}$ and a line spread function $h_B(x; d)$ of the focus detection pixel $S_{HB}$:

$$g_A(x) \int_{-\infty}^{\infty} dx'\, h_A(x-x'; d) f(x') \tag{2A}$$

$$g_B(x) \int_{-\infty}^{\infty} dx'\, h_B(x-x'; d) f(x'). \tag{2B}$$

In the above relationship, a displacement amount (that is, a phase difference) p of the light quantity distributions $g_A(x)$ and $g_B(x)$ is calculated as a value making the following expression (3) for correlation calculation minimum:

$$\int_{-\infty}^{\infty} dx |g_A(x+p) - g_B(x)| = \tag{3}$$
$$\int_{-\infty}^{\infty} dx f(x-x') \int_{-\infty}^{\infty} dx' |h_A(x'+p; d) - h_B(x'; d)|.$$

Moreover, a base length c that is a centroid distance between the line spread functions $h_A$ and $h_B$ is defined by the following expression (4):

$$c = \frac{\int_{-\infty}^{\infty} dx\, x \cdot h_A(x)}{\int_{-\infty}^{\infty} dx\, h_A(x)} - \frac{\int_{-\infty}^{\infty} dx\, x \cdot h_B(x)}{\int_{-\infty}^{\infty} dx\, h_B(x)}. \tag{4}$$

The displacement amount p corresponds to an amount of translation (parallel shift) by which the line spread functions $h_A$ and $h_B$ coincide with each other, and is equal to the base length c if there is no influence of noise or the like. That is, the following relationship is established:

$$p = c \tag{5}.$$

The point spread function, that is, an intensity distribution of a point image formed on an image-forming surface by a light flux that has been emitted from a point light source and has passed through an exit pupil of an image-forming optical system, can be considered to be a reduced projection result of a pupil intensity distribution having a shape of the exit pupil. Similarly, the line spread function can be considered to be a reduced projection result of an exit pupil shape in a one-dimensional direction, that is, a one-dimensional pupil intensity distribution obtained by integrating a pupil intensity distribution having the shape of the exit pupil in a direction orthogonal to the pupil division direction, onto the image-forming surface through the micro-lens ML. Therefore, the line spread function corresponds to a result of scale-transformation of the one-dimensional pupil intensity distribution shown in FIG. 16 or FIG. 18, and can be considered to be a result of reduction of the one-dimensional pupil intensity distribution in the horizontal direction and enlargement thereof in the vertical direction.

A coordinate of the pupil surface Me of the micro-lens ML is represented by X, and a one-dimensional pupil intensity distribution function of the focus detection pixel $S_{HA}$ is represented by $p_A(X)$. Moreover, a one-dimensional pupil intensity distribution function of the focus detection pixel $S_{HB}$ is represented by $p_B(X)$.

Figures 19A, 19B:
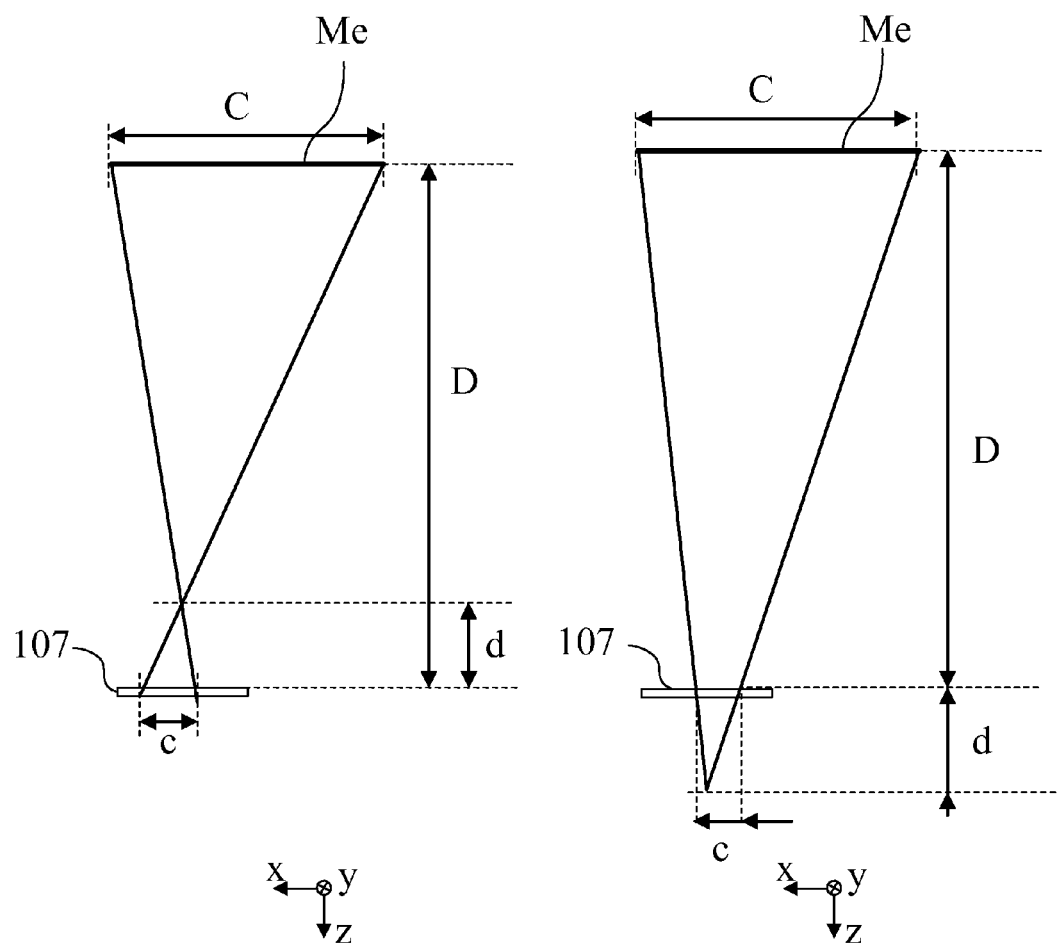
FIGS. 19A and 19B show light rays entering the image sensor in a defocus state in Example 1.

In addition, as shown in FIGS. 19A and 19B, a distance (pupil distance) to the pupil surface Me from the image sensor 107 is represented by D. The line spread function $h_A(x; d)$ of the focus detection pixel $S_{HA}$ and the line spread function $h_B(x; d)$ of the focus detection pixel $S_{HB}$ for an arbitrary defocus amount d can be calculated by the following scale-transformation:

$$x = \frac{d}{D+d} X \quad (6)$$

$$h_A(x; d) = \left| \frac{D+d}{d} \right| p_A\left(\frac{D+d}{d} x\right) \quad (7A)$$

$$h_B(x; d) = \left| \frac{D+d}{d} \right| p_B\left(\frac{D+d}{d} x\right). \quad (7B)$$

In the above expressions, the defocus amount d is a negative value in a forward defocus state (FIG. 19A) and a positive value in a backward defocus state (FIG. 19B) on the basis of a position 0 of the image sensor 107.

The base length C between the one-dimensional pupil intensity distribution functions $p_A$ and $p_B$ is defined by the following expression (8):

$$C = \frac{\int_{-\infty}^{\infty} dXX \cdot p_A(X)}{\int_{-\infty}^{\infty} dX p_A(X)} - \frac{\int_{-\infty}^{\infty} dXX \cdot p_B(X)}{\int_{-\infty}^{\infty} dX p_B(X)}. \quad (8)$$

The relational expression (6) for the scale-transformation is established between the base length c between the line spread functions $h_A$ and $h_B$ and the base length C between the one-dimensional pupil intensity distribution functions $p_A$ and $p_B$, that is, the following relationship is established:

$$d = \frac{D}{C-c} c. \quad (9)$$

In addition, since a high degree of coincidence between the line spread functions $h_A$ and $h_B$ establishes the relationship shown by the expression (5), the displacement amount p and the defocus amount d have a relationship shown by the following expression (10):

$$d = \frac{D}{C-p} p. \quad (10)$$

Accordingly, knowing the light quantity distributions $g_A(x)$ and $g_B(x)$ of the paired object images formed by the light fluxes that have passed through the mutually different pupil areas enables calculation of the defocus amount of the image-forming optical system (image-taking optical system) from the displacement amount p and the expression (10).

However, if the light-limiting member such as the lens holding member causes vignetting of the pupil intensity distribution of the entering light flux on the pupil surface Me of the micro-lens ML provided for the focus detection pixels $S_{HA}$ and $S_{HB}$ as shown in FIG. 16 and FIG. 18, the degree of coincidence between the line spread functions $h_A$ and $h_B$ is decreased.

The decreased degree of coincidence does not allow establishment of the expressions (5) and (10), which deteriorates detection accuracy of the defocus amount. Therefore, restoring the A- and B-images (that is, the A- and B-image signals) so as to increase the degree of coincidence between the A- and B-images (that is, the degree of coincidence between the line spread functions $h_A$ and $h_B$) is effective for improvement of the detection accuracy of the defocus amount.

Next, description will be made of a method for restoring the A- and B-images in this example. As a line width of the object image becomes wider as compared with an arrangement interval (pitch) of the focus detection pixels, image shape deterioration with discretization of object image data is reduced.

Therefore, when a contrast of the object image is sufficiently high, the method performs a process to reduce sharpness of the restored object image so as to smooth it as compared with that of the unrestored object image, which further improves the detection accuracy of the defocus amount. This process is hereinafter referred to as a "first process". The first process smoothes the object image, which enables removal of a high-frequency noise component from the object image, simultaneously with the image restoration.

On the other hand, when the line width of the object image is wide and thereby the contrast thereof is low, the method performs a process to increase the sharpness of the restored object image so as to narrow the line width thereof as compared with that of the unrestored object image. This increases the contrast of the restored object image, which further improves the detection accuracy of the defocus amount. This process is hereinafter referred to as a "second process".

Thus, the method of this example calculates a contrast evaluation value (contrast value) of the object image obtained from an output signal of the image sensor. The "output signal of the image sensor" in this example may be any one of the pixel signal from the focus detection pixel, at least one of the A- and B-image signals, and the pixel signal from the image pickup pixel. When the contrast evaluation value is higher than a predetermined value, the method performs the first process to make the A- and B-image signals smoother than before the restoration. On the other hand, when the contrast evaluation value is lower (or equal to or lower) than the predetermined value, the method performs the second process to make the A- and B-image signals sharper than before the restoration. Thus, the method can perform appropriate image restoration according to the contrast of the object image, thereby improving detection accuracy of the focus state of the image-taking optical system. The first and second processes are executed by the camera CPU 121 serving as first and second signal processors.

Description will hereinafter be made of a focus detection process (focus detection method) performed by the camera CPU 121 with reference to a flowchart shown in FIG. 20. This process is executed according to a computer program stored in a ROM provided in the camera CPU 121. This also applies to other examples which will be described later.

At step S001, the camera CPU 121 obtains lens information including information on a vignetting state (vignetting information) of the image-taking optical system, and then proceeds to step S002.

At step S002, the camera CPU 121 obtains a focus detection area selected by a user or automatically set by the camera CPU 121, and then proceeds to step S003.

At step S003, the camera CPU 121 retrieves information on the pupil intensity distributions (pupil intensity distribution information), which is stored in the ROM in the camera CPU 121, for the focus detection pixels included in the focus detection area obtained at step S002. Then, the camera CPU 121 integrates the pupil intensity distribution in the direction orthogonal to the pupil division direction by using the pupil intensity distribution information and the vignetting information obtained at step S001 to calculate the one-dimensional pupil intensity distribution functions corresponding to the A- and B-images. In addition, the camera CPU 121 calculates the base length C between these one-dimensional pupil intensity distribution functions by using the expression (8). Thereafter, the camera CPU 121 proceeds to step S004.

At step S004, the camera CPU 121 retrieves the pixel signals from the focus detection pixels included in the focus detection area obtained at step S002 to produce the A-image signal and the B-image signal. In the following description, the A-image signal and the B-image signal are referred to as an A-image and a B-image, respectively. Then, the camera CPU 121 proceeds to step S005.

At step S005, the camera CPU 121 predicts shading of the A- and B-images produced at step S004 from the one-dimensional pupil intensity distribution functions obtained at step S003 to perform shading correction on the A- and B-images. Then, the camera CPU 121 proceeds to step S006.

At step S006, the camera CPU 121 performs correlation calculation on the A- and B-images on which the shading correction has been performed at step S005 (that is, the A- and B-images on which the first and second processes have not been performed) to obtain the displacement amount (phase difference) between these A- and B-images. Then, the camera CPU 121 calculates a provisional value of the defocus amount (hereinafter referred to as a "provisional defocus amount) by using the expression (10). Thereafter, the camera CPU 121 proceeds to step S007.

At step S007, the camera CPU 121 obtains the contrast evaluation value by a known contrast evaluating method by using at least one of the A- and B-images on which the shading correction has been performed at step S005. Then, the camera CPU 121 proceeds to step S010. If a contrast evaluation target image of the A- and B-images has a high contrast, the contrast evaluation value becomes high, and if the contrast evaluation target image has a low contrast, the contrast evaluation value becomes low. The contrast evaluation value may be obtained, for example, by a calculation of (maximum image intensity value)-(minimum image intensity value), or by using a maximum absolute value of the intensity difference between the mutually adjacent pixels. In addition, the contrast evaluation value may be obtained by other methods.

At step S010, the camera CPU 121 determines whether or not the contrast evaluation value calculated at step S007 is higher than the predetermined value. If the contrast evaluation value is higher than the predetermined value, the camera CPU 121 proceeds to step S100 to perform the first process. If the contrast evaluation value is lower (or equal to or lower) than the predetermined value, the camera CPU 121 proceeds to step S200 to perform the second process. Detailed description will be made of the first and second processes below.

Figure 21A:
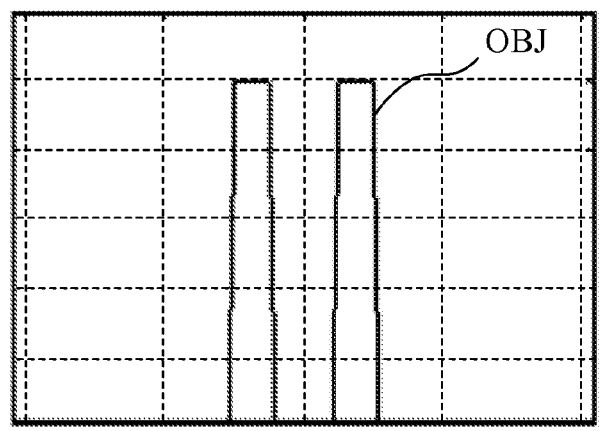
FIGS. 21A to 21C show asymmetry of object images in Example 1.
Figure 21B:
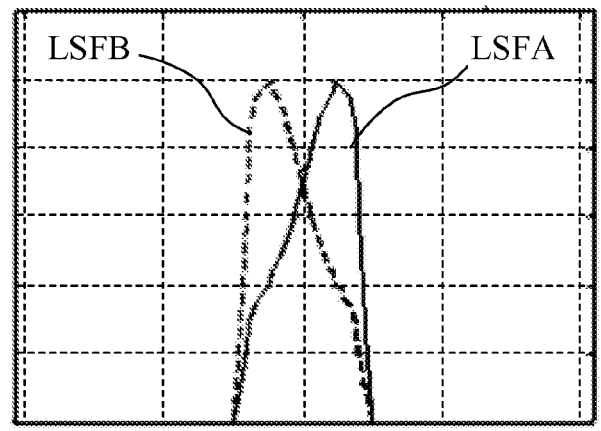
Figure 21C:
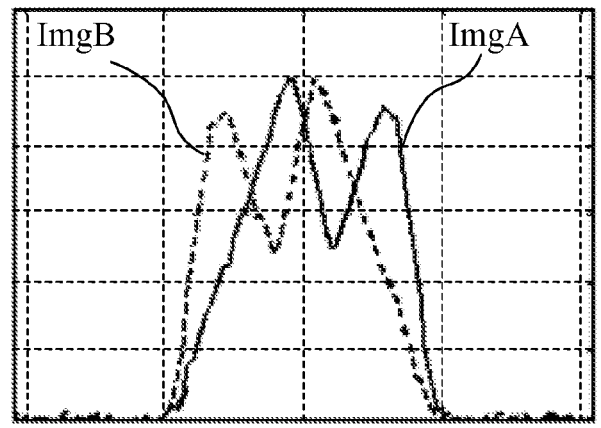

As described above, the asymmetry of the A- and B-images is caused by the convolution of the focus detection pixels $S_{HA}$ and $S_{HB}$ with the asymmetric line image distribution. FIGS. 21A to 21C show the asymmetry of the object images.

In FIGS. 21A to 21C, a horizontal axis shows a coordinate in the x-direction in the focus detection area, and a vertical axis shows luminance of the object image. FIG. 21A shows a light quantity distribution Obj(f) of the object image. In FIG. 21B, a solid line and a broken line respectively show a line image LSFA($h_A$) of the focus detection pixel $S_{HA}$ and a line image LSFB ($h_B$) of the focus detection pixel $S_{HB}$ for a certain defocus amount d. Moreover, in FIG. 21C, a solid line and a broken line respectively show an A-image ImgA($g_A$) and a B-image ImgB ($g_B$) that correspond to the object images for a certain defocus amount d. The A-image ImgA($g_A$) and the B-image ImgB ($g_B$) are asymmetric with each other, and therefore the degree of coincidence thereof is not high.

At step S100, the camera CPU 121 performs the first process to correct the asymmetry of the A- and B-images so as to make the restored A- and B images smoother than the unrestored A- and B-images.

Detailed description will be made of the first process. The A-image $g_A$ is obtained by the above-described (and following) expression (2A):

$$g_A(x) = \int_{-\infty}^{\infty} dx' h_A(x-x'; d) f(x'). \quad (2A)$$

A restored image $g_{A,B}$ obtained by convolution of the A-image $g_A$, which has been produced from the pixel signal from the focus detection pixel $S_{HA}$, with the line image $h_B$ of the focus detection pixel $S_{HB}$ is shown as follows:

$$\begin{aligned} g_{A,B}(x) &= \int_{-\infty}^{\infty} dx' h_B(x-x'; d) g_A(x') \\ &= \int_{-\infty}^{\infty}\int_{-\infty}^{\infty} dx'' dx' h_B(x-x''; d) h_A(x''-x'; d) f(x') \\ &= \int_{-\infty}^{\infty}\int_{-\infty}^{\infty} dx'' dx' h_B(x''; d) h_A(x'; d) f(x-x'-x''). \end{aligned} \quad (11A)$$

Similarly, a restored image $g_{B,A}$ obtained by convolution of the B-image $g_B$, which has been produced from the pixel signal from the focus detection pixel $S_{HB}$, with the line image $h_A$ of the focus detection pixel $S_{HA}$ is shown as follows:

$$g_{B,A}(x) = \int_{-\infty}^{\infty}\int_{-\infty}^{\infty} dx'' dx' h_B(x''; d) h_A(x'; d) f(x-x'-x''). \quad (11B)$$

As understood from the expressions (11A) and (11B), the restored image $g_{A,B}$ and the restored image $g_{B,A}$ are mutually equal (in other words, have a same shape).

Moreover, removal of the asymmetry of the A-image and the B-image while maintaining the centroid distance between the A-image and the B-image is achieved by convolution of the A-image $g_A$ with a line image $h0_B$ obtained by moving a centroid of the line image $h_B$ to an origin, and convolution of the B-image $g_B$ with a line image $h0_A$ obtained by moving a centroid of the line image $h_A$ to the origin.

Figure 22A:
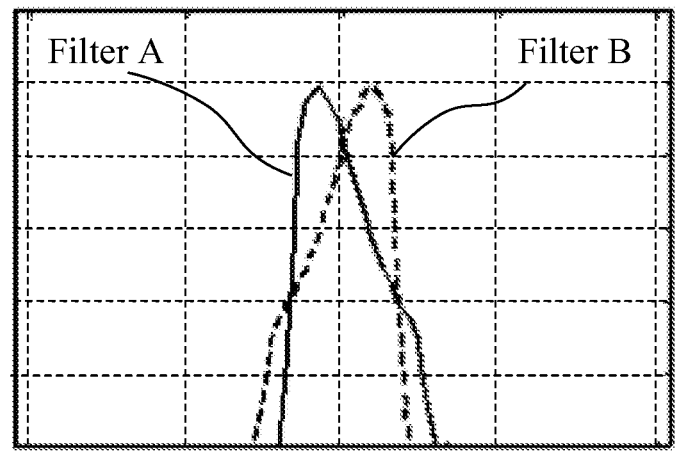
FIGS. 22A and 22B show a filter process to increase a line width of a restored image in Example 1.
Figure 22B:
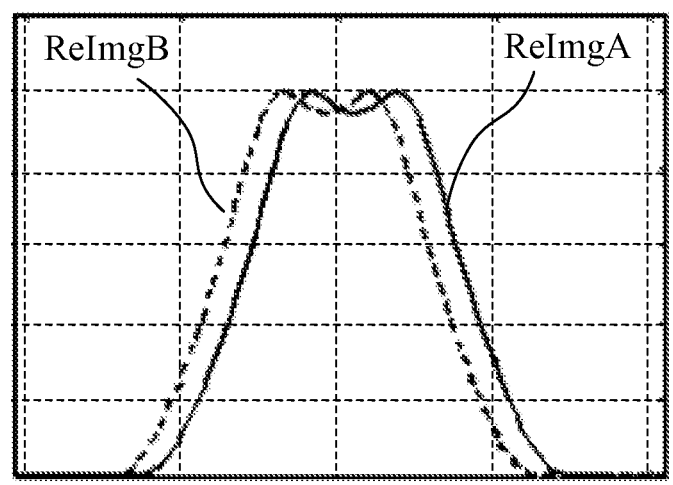

FIGS. 22A and 22B show a filter process to remove the asymmetry of the A- and B-images. In FIG. 22A, a solid line and a broken line respectively show an A-image restoration filter FilterA (line image h0$_B$) and a B-image restoration filter FilterB (line image h0$_A$) for a certain defocus amount. In FIG. 22B, a solid line and a broken line respectively show a restored image ReImgA obtained by convolution of the A-image ImgA with the A-image restoration filter FilterA and a restored image ReImgB obtained by convolution of the B-image ImgB with the B-image restoration filter FilterB. As shown in FIG. 22B, the restored image ReImgA and the restored image ReImgB have a same shape.

According the first process, the restored image ReImgA shown by the solid line in FIG. 22B is produced by the convolution of the A-image ImgA shown by the solid line in FIG. 21C with the A-image restoration filter FilterA (line image h0$_B$), so that the restored image ReImgA becomes unsharper and smoother, which increases a line width of the restored image ReImgA, as compared with the unrestored A-image ImgA. Similarly, the restored image ReImgB shown by the dotted line in FIG. 22B is produced by the convolution of the B-image ImgB shown by the dotted line in FIG. 21C with the B-image restoration filter FilterB (line image h0$_A$), so that the restored image ReImgB becomes unsharper and smoother, which increases a line width of the restored image ReImgB, as compared with the unrestored B-image ImgB.

This example uses, for the A- and B-images ImgA and ImgB, such image restoration filters enabling convolution with mutually different line images (that is, mutually different image restoration filters), in order to increase the degree of coincidence between the restored images ReImgA and ReImgB.

Figure 23:
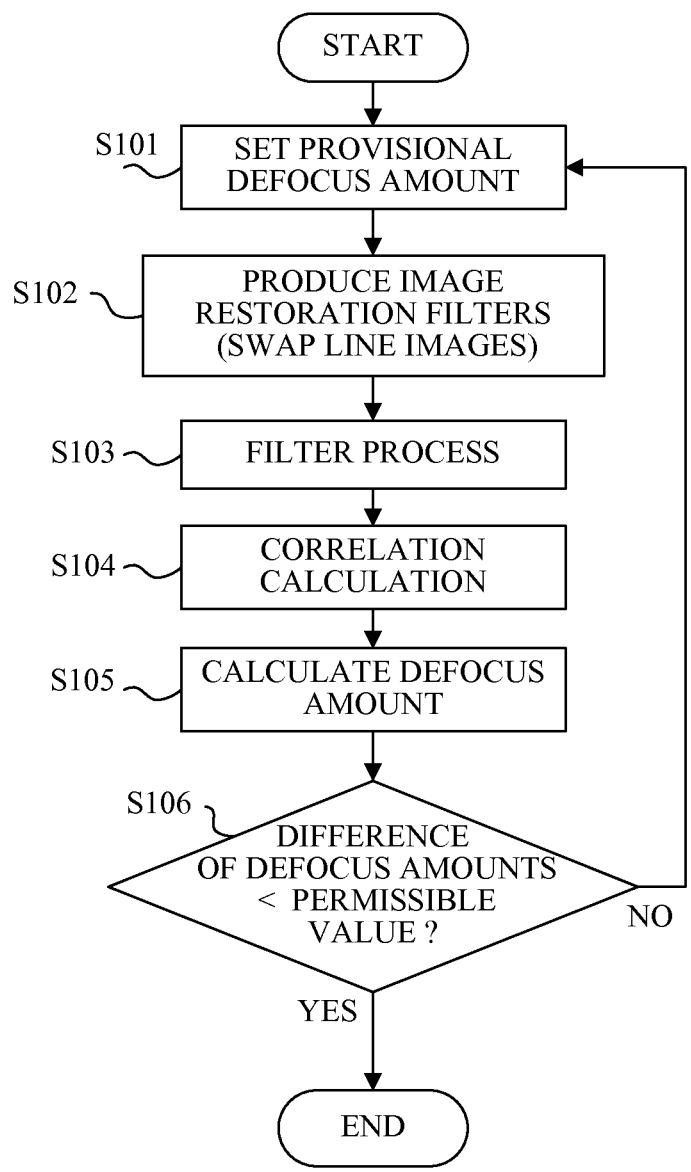
FIG. 23 is a flowchart showing a first process in Example 1.

FIG. 23 shows a flowchart of the first process performed at step S100.

At step S101, the camera CPU 121 sets the provisional defocus amount calculated at step S006 as an input value, and then proceeds to step S102.

At step S102, the camera CPU 121 produces the image restoration filters. Specifically, the camera CPU 121 performs the scale-transformation of the one-dimensional pupil intensity distribution function obtained at step S003 on the basis of the provisional defocus amount set at step S101 and according to the expressions (6), (7A) and (7B) to obtain the line image A (h$_A$) and the line image B (h$_B$) respectively corresponding to the A-image and the B-image. Furthermore, the camera CPU 121 obtains a line image A0 (h0$_A$) that is a result of translation of the line image A such that the centroid thereof is moved to the origin, and obtains a line image B0 (h0$_B$) that is a result of translation of the line image B such that the centroid thereof is moved to the origin.

Then, the camera CPU 121 sets the "line image B0" as the A-image restoration filter corresponding to the A-image and sets the "line image A0" as the B-image restoration filter corresponding to the B-image. In other words, as described about the expressions (11A) and (11B), the camera CPU 121 uses a result of swap of the line images A0 and B0 as the image restoration filters. Thereafter, the camera CPU 121 proceeds to step S103.

At step S103, the camera CPU 121 performs the convolution of the A-image with the A-image restoration filter (line image B0) obtained at step S102 to produce the restored image A (ReImgA). Similarly, the camera CPU 121 performs the convolution of the B-image with the B-image restoration filter (line image A0) obtained at step S102 to produce the restored image B (ReImgB). Then, the camera CPU 121 proceeds to step S104.

At step S104, the camera CPU 121 calculates the phase difference between the restored images A (ReImgA) and B (ReImgB) produced at step S103 by using a known correlation calculation method. Then, the camera CPU 121 proceeds to step S105.

At step S105, the camera CPU 121 calculates the defocus amount by using the expression (10) from the phase difference obtained at step S104, and then proceeds to step S106.

At step S106, the camera CPU 121 calculates an absolute value of a difference between the provisional defocus amount set at step S101 and the defocus amount calculated at step S105. If the absolute value of the difference is smaller (or equal to or smaller) than a predetermined permissible value, the camera CPU 121 proceeds to step S008 in FIG. 20 to fix the defocus amount calculated at step S105 as the defocus amount that is used in the first process. If the absolute value of the difference is greater than the predetermined permissible value, the camera CPU 121 returns to step S101.

Next, detailed description will be made of the second process. The second process replaces the line spread function h$_A$(x; d) of the focus detection pixel S$_{HA}$ and the line spread function h$_B$(x; d) of the focus detection pixel S$_{HB}$, which are shown by the expressions (2A) and (2B), by a same line spread function h$_C$(x; d) to restore the A-image and the B-image so as to provide a same shape to them.

First, the second process performs Fourier transform of each line spread function. A wave number is represented by k, a Fourier component of the light quantity distribution f(x) of the object is represented by F(k), a Fourier component of the light quantity distribution g$_A$(x) of the A-image is represented by G$_A$(k), and a Fourier component of the light quantity distribution g$_B$(x) of the B-image is represented by G$_B$(k). A Fourier component of the line spread function h$_A$(x; d) of the A-image is represented by H$_A$(k; d), a Fourier component of the line spread function h$_B$(x; d) of the B-image is represented by H$_B$(k; d), and a Fourier component of the line spread function h$_C$(x; d) after the replacement is represented by H$_C$(k; d).

The Fourier transform of the expression (2A) provides the following expression:

$$G_A(k) = H_A(k;d) F(k) \tag{12A}$$

Multiplication of both sides of the expression (12A) by H$_C$/H$_A$ provides the following expression:

$$\frac{H_C(k;d)}{H_A(k;d)} G_A(k) = H_C(k;d) F(k). \tag{13A}$$

Thus, inverse Fourier transform of the expression (13A) by using a replacement filter r$_A$(x; d) of the A-image (hereinafter referred to as an "A-image replacement filter"), which is an inverse Fourier transform result of H$_C$/H$_A$, provides the following restored image g$_{A,A}$:

$$g_{A,A}(x) = \int_{-\infty}^{\infty} dx' r_A(x-x') g_A(x') = \int_{-\infty}^{\infty} dx' h_C(x-x') f(x'). \tag{14A}$$

Similarly, using a replacement filter r$_B$(x; d) of the B-image (hereinafter referred to as a "B-image replacement filter"), which is an inverse Fourier transform result of H$_C$/H$_B$, provides the following restored image g$_{B,B}$:

$$g_{B,B}(x) = \int_{-\infty}^{\infty} dx' r_B(x-x') g_B(x') = \int_{-\infty}^{\infty} dx' h_C(x-x') f(x'). \quad (14B)$$

As understood from the expressions (14A) and (14B), replacement of the line images $h_A$ and $h_B$ by the line image $h_C$ makes the restored image $g_{A,A}$ and the restored image $g_{B,B}$ coincident with each other.

Making the line width of the replaced line spread function $h_C$ narrower than those of the line spread functions $h_A$ and $h_B$ of the A- and B-images enables sharpening of the restored image. However, an excessively narrow line width of the line spread function $h_C$ causes amplification of a high frequency noise component, which deteriorates the degree of coincidence of the restored images. Therefore, the line width of the line spread function $h_C$ is desirable to be 0.25 to 1.0 times the line widths of the line spread functions $h_A$ and $h_B$ of the A- and B-images.

Removal of the asymmetry of the A-image and the B-image while maintaining the centroid distance between the A-image and the B-image can be achieved by using a Fourier component $H0_A$ of the line image $h0_A$ obtained by moving the centroid of the line image $h_A$ to the origin instead of the Fourier component $H_A$ and by using a Fourier component $H0_B$ of the line image $H_A$ obtained by moving the centroid of the line image $h_B$ to the origin instead of the Fourier component $H_B$.

In addition, it is desirable to produce a parent filter $m_A(X)$ for the A-image (hereinafter referred to as an "A-image parent filter") on the basis of the one-dimensional pupil intensity distribution function $p_A(X)$ of the focus detection pixel $S_{HA}$, in order to efficiently produce the A-image replacement filter $r_A(x; d)$ in response to variation of the defocus amount d.

A wave number is represented by K, a Fourier component of $p0_A(X)$ obtained by moving a centroid of the one-dimensional pupil intensity distribution function $p_A(X)$ of the focus detection pixel $S_{HA}$ to the origin is represented by $P0_A(K)$, a Fourier component of the replaced one-dimensional pupil intensity distribution function $p_C(X)$ is represented by $P_C(K)$, and an inverse Fourier transform result of $P_C/P0_A$ is defined as the A-image parent filter $m_A(X)$.

In this case, corresponding to the expressions (6) and (7A) of the scale-transformation, the line spread function $h_A(x; d)$ of the A-image for the defocus amount d can be obtained from the A-image parent filter $m_A(X)$ by the following scale-transformation:

$$x = \frac{d}{D+d} X \quad (6)$$

$$r_A(x; d) = \left|\frac{D+d}{d}\right| m_A\left(\frac{D+d}{d}x\right). \quad (15A)$$

Similarly, the line spread function $h_B(x; d)$ of the B-image for the defocus amount d can be obtained from a parent filter $m_B(X)$ for the B-image (hereinafter referred to as a "B-image parent filter") by the following scale-transformation:

$$r_B(x; d) = \left|\frac{D+d}{d}\right| m_B\left(\frac{D+d}{d}x\right). \quad (15B)$$

The B-image parent filter $m_B(X)$ is an inverse Fourier transform result of $P_C/P0_B$ where a Fourier component of $p0_B(X)$ obtained by moving a centroid of the one-dimensional pupil intensity distribution function $p_B(X)$ of the focus detection pixel $S_{HB}$ to the origin is represented by $P0_B(K)$.

FIGS. 24A to 24D show a replacement filter process to remove the asymmetry of the A- and B-images. A solid line and a broken line in FIG. 24A respectively show the line image LSFA0 ($h0_A$) obtained by moving the centroid of the line image LSFA ($h_A$) to the origin and the line image LSFB0 ($h0_B$) obtained by moving the centroid of the line image LSFB ($h_B$) to the origin at a certain defocus amount.

Figure 24A:
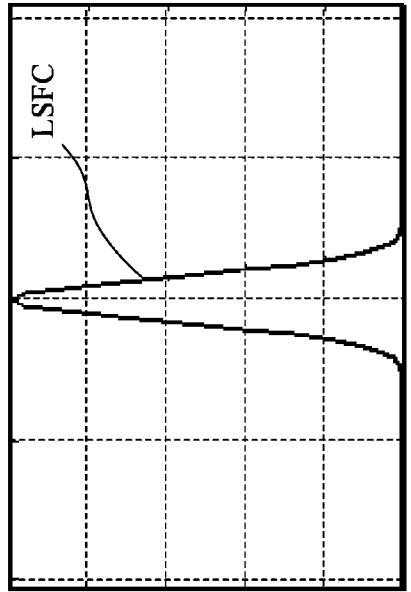
FIGS. 24A to 24D show a filter process to decrease the line width of the restored image in Example 1.
Figure 24B:
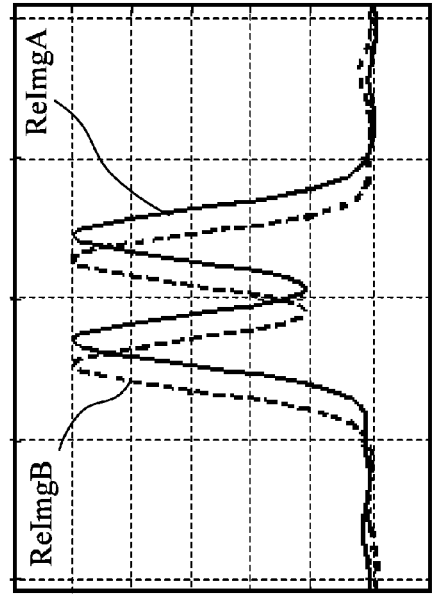
Figure 24C:
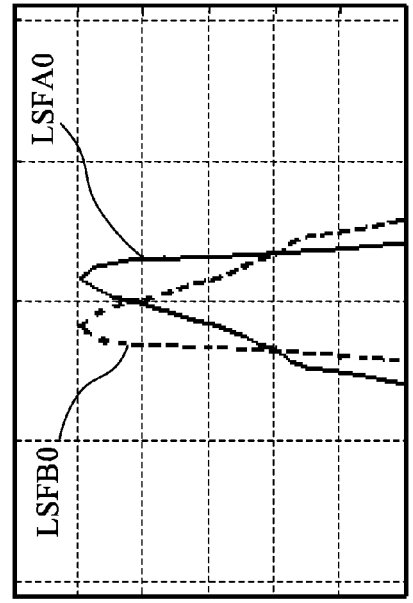

FIG. 24B shows the replaced line image LSFC ($h_C$). The line width of the replaced line image LSFC is narrower than those of the line images LSFA0 and LSFB. A solid line and a broken line in FIG. 24C respectively show the A-image replacement filter FilterA ($r_A$) and the B-image replacement filter FilterB ($r_B$) at a certain defocus amount.

Figure 24D:
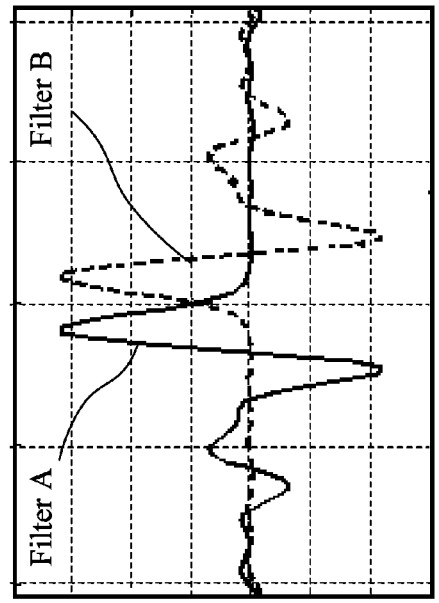

A solid line shown in FIG. 24D shows the restored image ReImgA obtained by the convolution of the A-image ImgA with the A-image replacement filter FilterA ($r_A$). Moreover, a broken line in FIG. 24D shows the restored image ReImgB obtained by the convolution of the B-image ImgB with the B-image replacement filter. As shown in FIG. 24D, the restored image ReImgA and the restored image ReImgB have a same shape.

According to the second process, the restored image ReImgA shown by the solid line in FIG. 24D is replaced with the line image LSFC whose line width is narrow by the A-image replacement filter FilterA ($r_A$), so that the restored image ReImgA becomes sharper than the unrestored A-image ImgA shown by the solid line in FIG. 21C, which narrows the line width of the restored image ReImgA. Similarly, the restored image ReImgB shown by the broken line in FIG. 24D is replaced with the line image LSFC whose line width is narrow by the B-image replacement filter FilterB ($r_B$), so that the restored image ReImgB becomes sharper than the unrestored A-image ImgA shown by the broken line in FIG. 21C, which narrows the line width of the restored image ReImgB.

This example uses, for the A- and B-images ImgA and ImgB, such replacement filters enabling convolution with mutually different line images (that is, mutually different replacement filters), in order to increase the degree of coincidence between the restored images ReImgA and ReImgB.

Figure 25:
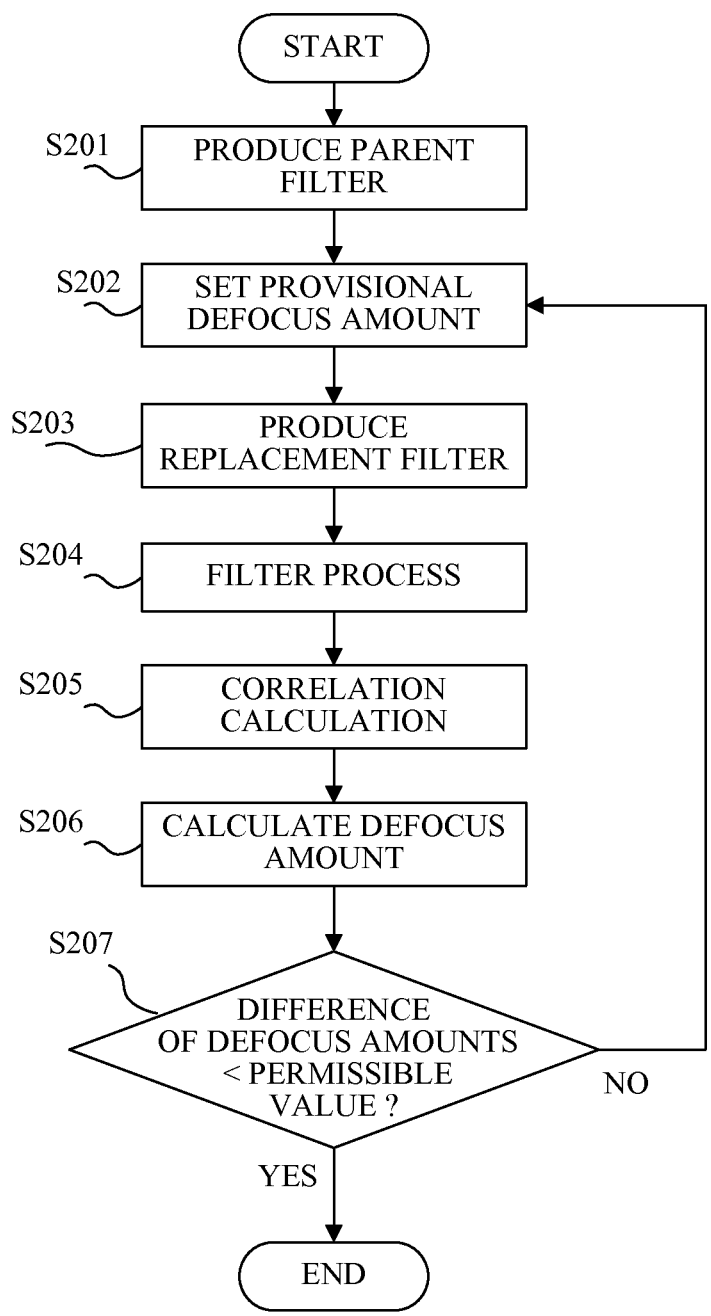
FIG. 25 is a flowchart showing a second process in Example 1.

FIG. 25 is a flowchart of the second process performed at step S200.

Figure 20:
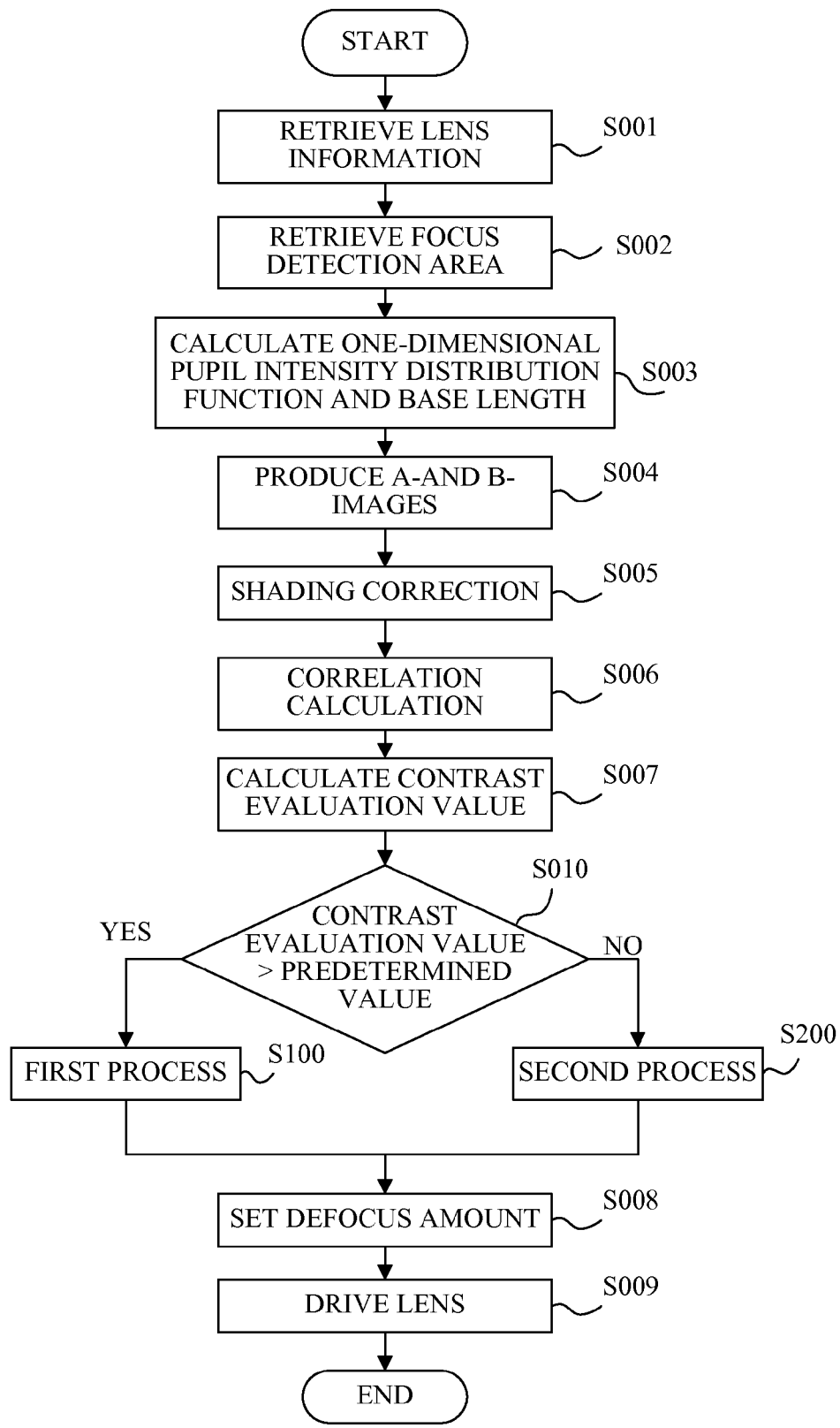
FIG. 20 is a flowchart showing a focus detection process in Example 1.

At step S201, the camera CPU 121 calculates, on the basis of the line widths of the one-dimensional pupil intensity distribution functions $p_A$ and $p_B$ of the focus detection pixels $S_{HA}$ and $S_{HB}$ obtained at step S003 in FIG. 20, a Gaussian-type replaced one-dimensional pupil intensity distribution function $p_C$ whose line width is narrower than those of $p_A$ and $p_B$.

Next, the camera CPU 121 calculates the A-image parent filter $m_A$ and the B-image parent filter $m_B$ by the above-described method, and then proceeds to step S202.

At step S202, the camera CPU 121 sets the provisional defocus amount calculated at step S006 in FIG. 20 as an input value, and then proceeds to step S203.

At step S203, the camera CPU 121 produces the replacement filters. Specifically, the camera CPU 121 performs the scale-transformation of the A- and B-image parent filters $m_A$ and $m_B$ on the basis of the provisional defocus amount set at step S101 and according to the expressions (6), (15A) and (15B) to calculate the A- and B-image replacement filters FilterA ($r_A$) and FilterB ($r_B$). Then, the camera CPU 121 proceeds to step S204.

At step S204, the camera CPU 121 performs the convolution of the A-image with the A-image replacement filter FilterA ($r_A$) obtained at step S203 to produce the restored image ReImgA. Similarly, the camera CPU 121 performs the convolution of the B-image with the B-image replacement filter FilterB ($r_B$) obtained at step S203 to produce the restored image ReImgB. Then, the camera CPU 121 proceeds to step S205.

At step S205, the camera CPU 121 calculates the phase difference between the restored images ReImgA and ReImgB produced at step S204 by using the known correlation calculation method.

At step S206, the camera CPU 121 calculates the defocus amount by using the expression (10) from the phase difference obtained at step S205, and then proceeds to step S207.

At step S207, the camera CPU 121 calculates an absolute value of a difference between the provisional defocus amount set at step S202 and the defocus amount calculated at step S206. If the absolute value of the difference is smaller (or equal to or smaller) than a predetermined permissible value, the camera CPU 121 proceeds to step S008 in FIG. 20 to fix the defocus amount calculated at step S206 as the defocus amount that is used in the second process. If the absolute value of the difference is greater than the predetermined permissible value, the camera CPU 121 returns to step S202.

At step S008 in FIG. 20, the camera CPU 121 sets the defocus amount calculated at step S100 or step S200 as a defocus amount for AF, and then proceeds to step S009.

At step S009, the camera CPU 121 calculates a movement direction and a movement amount of the third lens group 105 to obtain an in-focus state on the basis of the defocus amount for AF, and moves the third lens group 105 according to the calculation results. That is, the camera CPU 121 performs AF. Thus, a series of processes included in the focus detection process is ended.

This example performs appropriate image restoration according to the light flux vignetting state and the object image, which enables the improvement of the detection accuracy of the focus state of the image-taking optical system.

Other processes than the above-described processes may be used as the first and second processes.

Example 2

Next, description will be made of a second example (Example 2) of the present invention. As described in Example 1, as the line width of the object image becomes wider as compared with the arrangement interval (pitch) of the focus detection pixels, the image shape deterioration with the discretization of object image data is reduced. Therefore, when the defocus amount is small and a high-frequency component amount of the object image is great, performing a process to reduce sharpness of the restored object image so as to smooth it as compared with that of the unrestored object image, which further improves the detection accuracy of the defocus amount. This process is hereinafter referred to as a "first process". The first process smoothes the object image, which enables removal of a high-frequency noise component from the object image, simultaneously with the image restoration.

On the other hand, when the line width of the object image is wide and thereby the object image is significantly unsharp (blurred), performing a process to increase the sharpness of the restored object image so as to narrow the line width thereof as compared with that of the unrestored object image, which further improves the detection accuracy and a detection limit of the defocus amount. This process is hereinafter referred to as a "second process".

This example calculates a provisional defocus amount of the image-taking optical system, and performs the first process to make the restored image smoother than the unrestored image when the provisional defocus amount is smaller than a predetermined value. On the other hand, this example performs the second process to make the restored image sharper than the unrestored image when the provisional defocus amount is greater (or equal to or greater) than the predetermined value. This makes it possible to improve the detection accuracy of the focus state of the image-taking optical system.

Figure 26:
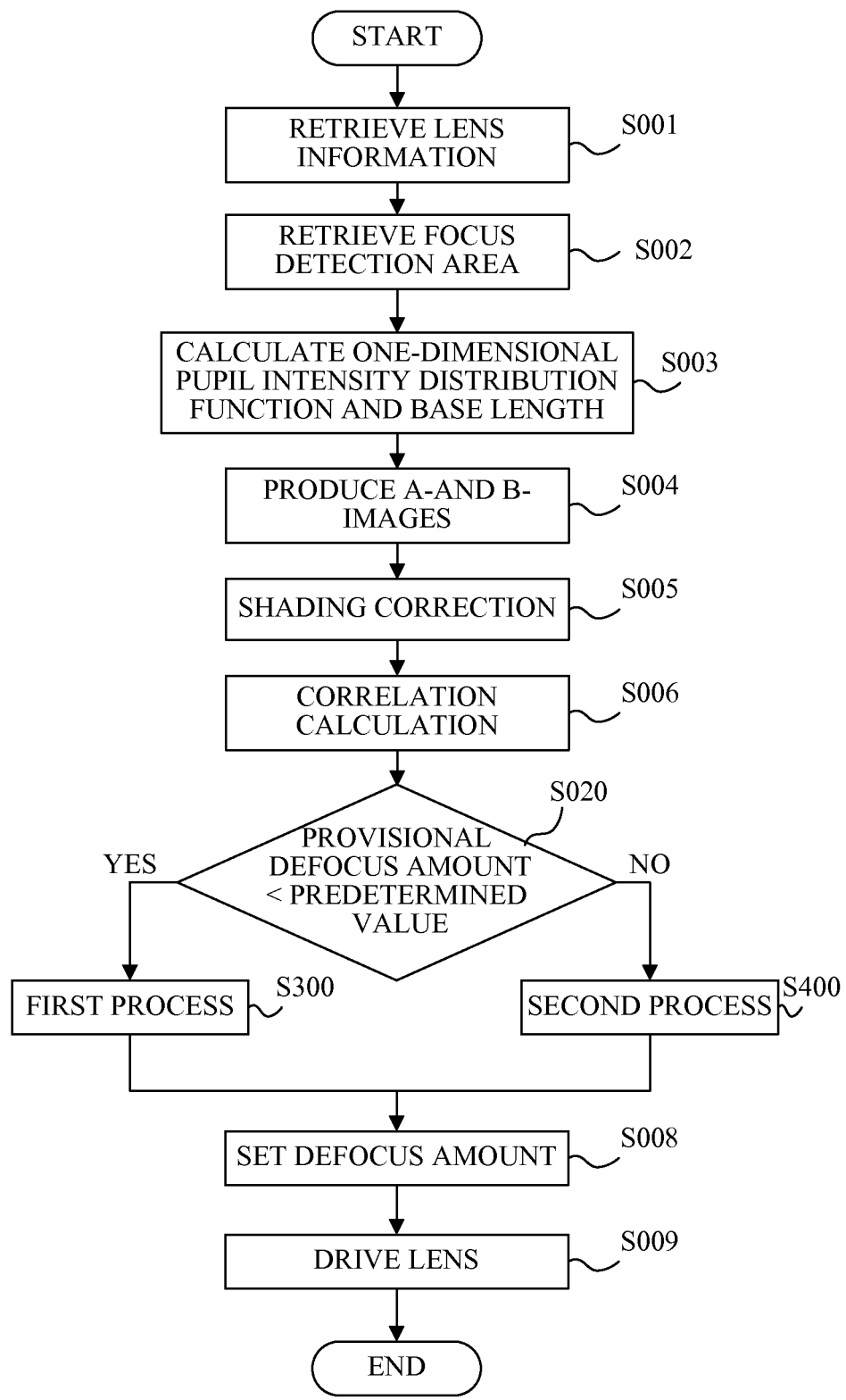
FIG. 26 is a flowchart showing a focus detection process in Example 2 of the present invention.

FIG. 26 is a flowchart of a focus detection process (focus detection method) in this example. In this flowchart, steps shown in FIG. 26 common to those shown in FIG. 20 in Example 1 are denoted by same reference step numbers as those in Example 1, and description thereof will be omitted.

At step S020, the camera CPU 121, which has calculated the provisional defocus amount by using the expression (10) at step S006, determines whether or not the provisional defocus amount is smaller than the predetermined value. If the provisional defocus amount is smaller than the predetermined value, the camera CPU 121 proceeds to step S300 to perform the first process. On the other hand, if the provisional defocus amount is greater (or equal to or greater than) the predetermined value, the camera CPU 121 proceeds to step S400 to perform the second process.

Detailed description will be made of the first process. Convolution of an A-image signal (hereinafter referred to as an "A-image") $g_A$ produced using the pixel signals from the focus detection pixels $S_{HA}$ with a B-image signal (hereinafter referred to as a "B-image") $g_B$ produced using the pixel signals from the focus detection pixels $S_{HB}$ provides a restored image $g_{A,B}$. Moreover, convolution of the B-image $g_B$ with the A-image $g_A$ provides a restored image $g_{B,A}$. These restored images $g_{A,B}$ and $g_{B,A}$ are mutually equal (in other words, have a same shape) as shown by the following expression (16).

$$g_{A,B}(x) = \int_{-\infty}^{\infty} dx' g_B(x-x';d) g_A(x') = \int_{-\infty}^{\infty} dx' g_A(x-x';d) g_B(x') = g_{B,A}(x) \tag{16}$$

A centroid of the line image $h_A$ is represented by $x_A$, and a centroid of the line image $h_B$ is represented by $x_B$. Removal of the asymmetry of the A-image $g_A$ and the B-image $g_B$ while maintaining the centroid distance between the A-image $g_A$ and the B-image $g_B$ is achieved by convolution of the A-image $g_A$ with an image $g0_B$ that is obtained by translating the B-image $g_B$ by $-x_B$ and used as an A-image restoration filter FilterA, and by convolution of the B-image $g_B$ with an image $g0_A$ that is obtained by translating the A-image $g_A$ by $-x_A$ and used as a B-image restoration filter FilterB.

According to the first process, the convolution of the A-image ImgA ($g_A$) with the A-image restoration filter FilterA ($g0_B$) produces the restored image ReImgA, which makes the restored image ReImgA unsharper and smoother so as to increase the line width of the restored image ReImgA, as compared with the unrestored A-image ImgA ($g_A$). Similarly, the convolution of the B-image ImgB ($g_B$) with the B-image restoration filter FilterB ($g0_A$) produces the restored image ReImgB, which makes the restored image ReImgB unsharper and smoother so as to increase the line width of the restored image ReImgB, as compared with the unrestored B-image ImgB ($g_B$).

This example uses, for the A- and B-images ImgA and ImgB, such image restoration filters enabling convolution with mutually different line images (that is, mutually different image restoration filters), in order to increase the degree of coincidence between the restored images ReImgA and ReImgB.

Figure 27:
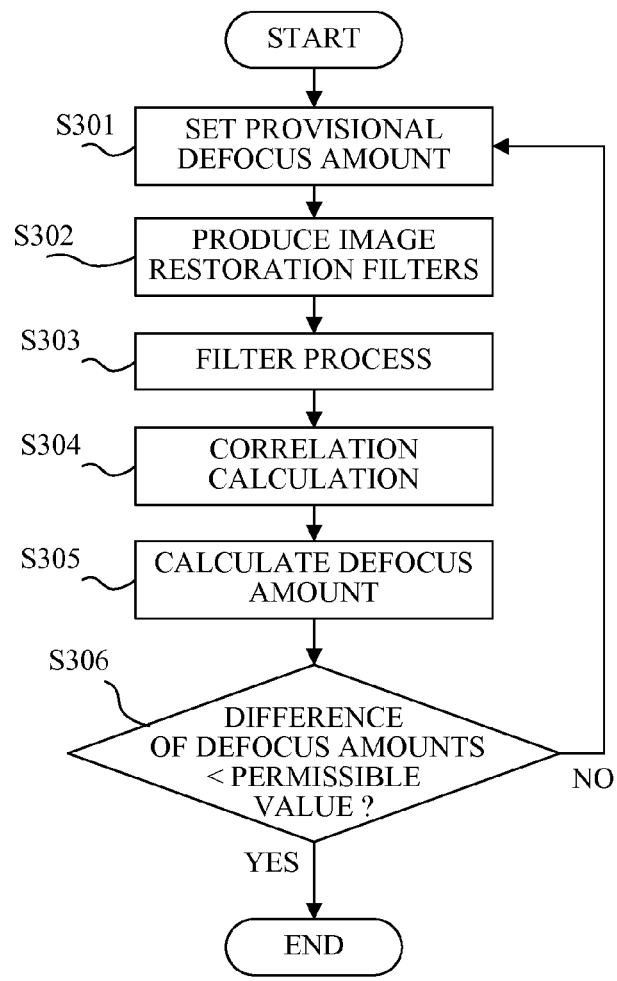
FIG. 27 is a flowchart showing a first process in Example 2.

FIG. 27 shows a flowchart of the first process performed at step S300.

At step S301, the camera CPU 121 sets the provisional defocus amount calculated at step S006 as an input value, and then proceeds to step S302.

At step S302, the camera CPU 121 produces the image restoration filters. Specifically, the camera CPU 121 performs the scale-transformation of the one-dimensional pupil intensity distribution function obtained at step S003 on the basis of the provisional defocus amount set at step S301 and according to the expression (6), (7A) and (7B) to calculate the line image A ($h_A$) and the line image B ($h_B$) respectively corresponding to the A-image and the B-image. Furthermore, the camera CPU 121 calculates the centroid $x_A$ of the line image A ($h_A$) and the centroid $x_B$ of the line image B ($h_B$).

Next, the camera CPU 121 translates the B-image by $-x_B$ to produce the image $g0_B$ as the A-image restoration filter FilterA ($g0_B$). Similar y, the camera CPU 121 translates the A-image by $-x_A$ to produce the image $g0_A$ as the B-image restoration filter FilterB ($g0_A$). Then, the camera CPU 121 proceeds to step S303.

At step S303, the camera CPU 121 performs the convolution of the A-image with the A-image restoration filter FilterA ($g0_B$) obtained at step S302 to produce the restored image ReImgA. Similarly, the camera CPU 121 performs the convolution of the B-image with the B-image restoration filter FilterB ($g0_A$) to produce the restored image ReImgB. Then, the camera CPU 121 proceeds to step S304.

At step S304, the camera CPU 121 calculates a phase difference between the restored images ReImgA and ReImgB produced at step S303 by using a known correlation calculation method. Then, the camera CPU 121 proceeds to step S305.

At step S305, the camera CPU 121 calculates the defocus amount by using the expression (10) from the phase difference obtained at step S304, and then proceeds to step S306.

At step S306, the camera CPU 121 calculates an absolute value of a difference between the provisional defocus amount set at step S301 and the defocus amount calculated at step S305. If the absolute value of the difference is smaller (or equal to or smaller) than a predetermined permissible value, the camera CPU 121 proceeds to step S008 in FIG. 20 to fix the defocus amount calculated at step S305 as the defocus amount that is used in the first process. If the absolute value of the difference is greater than the predetermined permissible value, the camera CPU 121 returns to step S301.

Next, detailed description will be made of the second process. The A-image $g_A$ and the B-image $g_B$ can be obtained by the above-described (following) expressions (2A) and (2B):

$$g_A(x) = \int_{-\infty}^{\infty} dx' h_A(x-x';d)f(x') \tag{2A}$$

$$g_B(x) = \int_{-\infty}^{\infty} dx' h_B(x-x';d)f(x'). \tag{2B}$$

When a relationship of the expressions (2A) and (2B) is established, a deconvolution process is performed in a recurrence manner by the following repetitive calculation to estimate an object f(x).

This example will consider a function sequence $f_{A,i}(x)$ and a function sequence $f_{B,i}(x)$ that are converged to the object f(x) where i represents a natural number. The A-image $g_A$ and the B-image $g_B$ are set as follows as initial functions for i=0:

$$f_{A,0}(x) = g_A(x) \tag{17A}$$

$$f_{B,0}(x) = g_B(x) \tag{17B}$$

Next, (i+1)-th functions $f_{A,i+1}$ and $f_{B,i+1}$ are calculated from i-th functions $f_{A,i}$ and $f_{B,i}$ based on the following recurrence formulae where α represents a real number from 0 to 1:

$$f'_{A,i+1}(x) = \max\left[f_{A,i}(x) + \alpha\left(g_A - \int_{-\infty}^{\infty} dx' h_A(x-x';d)f_{A,i}(x')\right), 0\right] \tag{18A}$$

$$f'_{B,i+1}(x) = \max\left[f_{B,i}(x) + \alpha\left(g_B - \int_{-\infty}^{\infty} dx' h_B(x-x';d)f_{B,i}(x')\right), 0\right] \tag{18B}$$

$$f_{A,i+1}(x) = \frac{1}{2}f'_{A,i+1}(x) + \frac{1}{2}f'_{B,i+1}(x) \tag{19A}$$

$$f_{B,i+1}(x) = \frac{1}{2}f'_{A,i+1}(x) + \frac{1}{2}f'_{B,i+1}(x). \tag{19B}$$

In the above recurrence formulae, $f'_{A,i+1}$ and $f'_{B,i+1}$ are supplementary function sequences used in the repetitive calculation. The expression (18A) is a recurrence formula to estimate the object f from the A-image $g_A$ and the line image $h_A$, and the expression (18B) is a recurrence formula to estimate the object f from the B-image $g_B$ and the line image $h_B$.

The expressions (19A) and (19B) are recurrence formulae to make the converging functions of the expressions (18A) and (18B) identical to each other.

The repetitive calculation is performed by using the expressions (17A), (17B), (18A), (18B), (19A) and (19B) until the function sequences $f_{A,i}(x)$ and $f_{B,i}(x)$ are converged. The converged functions coincide with f(x).

The repetitive calculation according to the following recurrence formulae, where a centroid of the line image $h_A$ is represented by $X_A$ and the centroid of the line image $h_B$ is represented by $X_B$, makes a centriod distance between a function $f_A$ that is a convergence result of the function sequence $f_{A,i}(x)$ and a function $f_B$ that is a convergence result of the function sequence $f_{B,i}(x)$ coincident with a centriod distance between the A-image $h_A$ and the B-image $g_B$:

$$f'_{A,i+1}(x) = \max\left[f_{A,i}(x) + \alpha\left(g_A - \int_{-\infty}^{\infty} dx' h0_A(x-x';d)f_{A,i}(x')\right), 0\right] \tag{20A}$$

$$f'_{B,i+1}(x) = \max\left[f_{B,i}(x) + \alpha\left(g_B - \int_{-\infty}^{\infty} dx' h0_B(x-x';d)f_{B,i}(x')\right), 0\right] \tag{20B}$$

$$f_{A,i+1}(x) = \frac{1}{2}f'_{A,i+1}(x) + \frac{1}{2}f'_{B,i+1}(x - (x_A - x_B)) \tag{21A}$$

$$f_{B,i+1}(x) = \frac{1}{2}f'_{A,i+1}(x + (x_A - x_B)) + \frac{1}{2}f'_{B,i+1}(x). \tag{21B}$$

The line image $h0_A$ is a result of movement of the centroid of the line image $h_A$ to an origin, and the line image $h0_B$ is a result of movement of the centroid of the line image $h_B$ to the origin.

Figure 28:
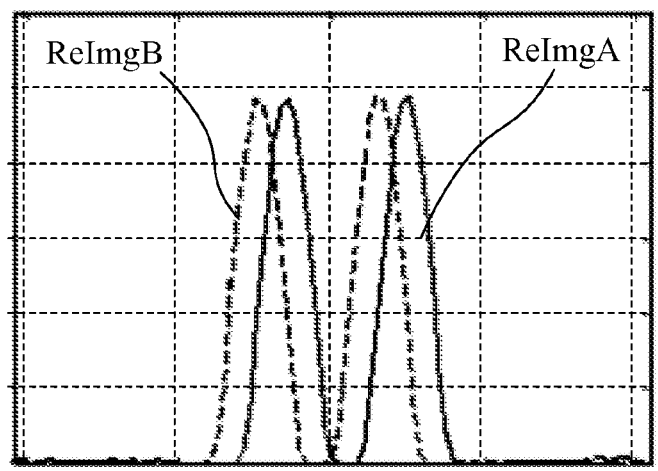
FIG. 28 shows a filter process to decrease a line width of a restored image in Example 2.

FIG. 28 conceptually shows a result of the deconvolution process by the repetitive calculation to remove the asymmetry of the A- and B-images. A solid line and a broken line in FIG. 28 respectively show the restored image ReImgA and the restored image ReImgB obtained by the deconvolution process on the A-image ImgA and the B-image ImgB shown in FIG. 21C by using the expressions (20A), (20B), (21A) and (21B).

According to the second process, the restored image ReImgA shown by the solid line in FIG. 28 is more sharpened by the deconvolution process than the unrestored A-image ImgA shown by the solid line in FIG. 21C, which narrows the line width of the restored image ReImgA. Similarly, the restored image ReImgB shown by the broken line in FIG. 28 is more sharpened by the deconvolution process than the unrestored B-image ImgB shown by the broken line in FIG. 21C, which narrows the line width of the restored image ReImgB.

Thus, this example performs the deconvolution process by the repetitive calculation, using the mutually different line images $h0_A$ and $h0_B$ as the filters, in order to increase the degree of coincidence between the restored images ReImgA and ReImgB.

Figure 29:
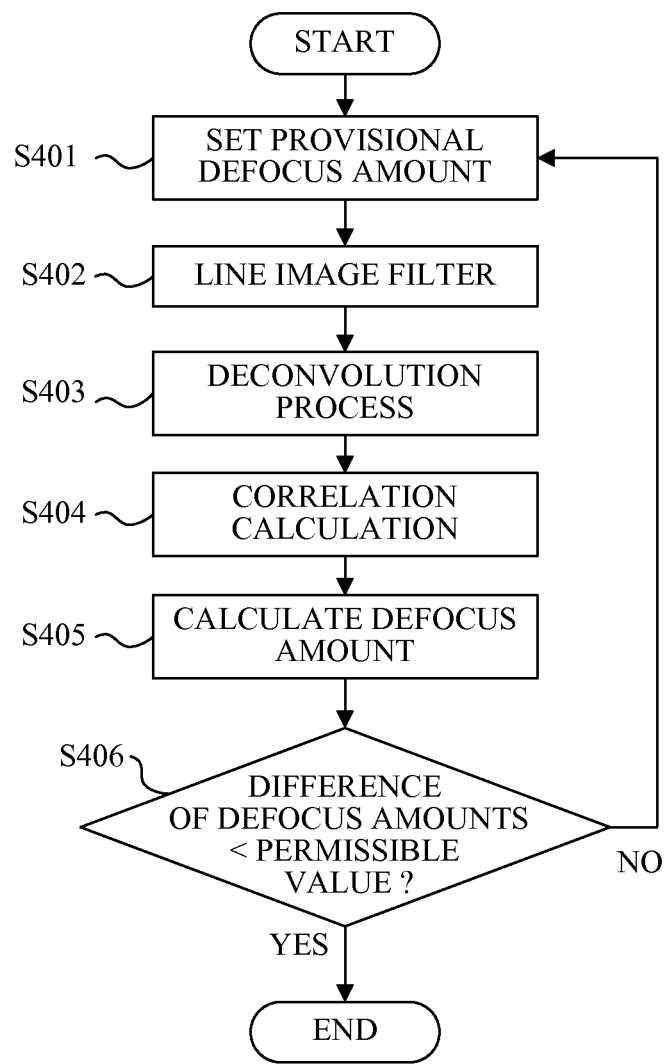
FIG. 29 is a flowchart showing a second process in Example 2.

FIG. 29 is a flowchart of the second process performed at step S400.

At step S401, the camera CPU 121 sets the provisional defocus amount calculated at step S006 as an input value, and then proceeds to step S402.

At step S402, the camera CPU 121 produces the line image filters. Specifically, the camera CPU 121 performs the scale-transformation of the one-dimensional pupil intensity distribution function obtained at step S003 on the basis of the provisional defocus amount set at step S401 and according to the expressions (6), (7A) and (7B) to obtain the line image A ($h_A$) and the line image B ($h_B$) respectively corresponding to the A-image and the B-image.

Next, the camera CPU 121 obtains a line image A0 ($h0_A$) as the line image filter for the A-image (hereinafter referred to as an "A-line image filter") that is a result of translation of the line image A such that the centroid thereof is moved to the origin, and obtains a line image B0 ($h0_B$) as the line image filter for the B-image (hereinafter referred to as a "B-line image filter") that is a result of translation of the line image B such that the centroid thereof is moved to the origin.

At step S403, the camera CPU 121 performs the deconvolution process on the A- and B-image, using the A- and B-line image filters and according to expressions (17A), (17B), (20A), (20B), (21A) and (21B), to produce the restored images ReImgA and ReImgB. Then, the camera CPU 121 proceeds to step S404.

At step S404, the camera CPU 121 calculates a phase difference between the restored images ReImgA and ReImgB produced at step S403 by using a known correlation calculation method. Then, the camera CPU 121 proceeds to step S405.

At step S405, the camera CPU 121 calculates the defocus amount by using the expression (10) from the phase difference obtained at step S404, and then proceeds to step S406.

At step S4106, the camera CPU 121 calculates an absolute value of a difference between the provisional defocus amount set at step S401 and the defocus amount calculated at step S405. If the absolute value of the difference is smaller (or equal to or smaller) than a predetermined permissible value, the camera CPU 121 proceeds to step S008 in FIG. 20 to fix the defocus amount calculated at step S405 as the defocus amount that is used in the second process. If the absolute value of the difference is greater than the predetermined permissible value, the camera CPU 121 returns to step S401.

This example performs appropriate image restoration according to the light flux vignetting state and the object image, which enables the improvement of the detection accuracy of the focus state of the image-taking optical system.

Other processes than the above-described processes may be used as the first and second processes.

Example 3

Next, description will be made of a third example (Example 3) of the present invention. As described in Example 1, as the line width of the object image becomes wider as compared with the arrangement interval (pitch) of the focus detection pixels, the image shape deterioration with the discretization of object image data is reduced. Therefore, when an aperture value is large (that is, an aperture diameter is small) and the line width of the object image is narrow, and thereby the object image is hard to become unsharp, performing a process to makes the restored object image unsharper and smoother than the unrestored object image so as to increase the line width of the object image, which further improves the detection accuracy of the defocus amount. This process is hereinafter referred to as a "first process". The first process smoothes the object image, which enables removal of a high-frequency noise component from the object image, simultaneously with the image restoration.

On the other hand, when the aperture value is small (that is, the aperture diameter is large) and the line width of the object image is wide and thereby the object image is easy to become unsharp, performing a process to make the restored object image sharper than the unrestored object image so as to narrow the line width of the object image, which further improves the detection accuracy and a detection limit of the defocus amount. This process is hereinafter referred to as a "second process".

This example performs the first process to make the restored image smoother than the unrestored image when the aperture value (hereinafter referred to as an "F-number") is larger than a predetermined value. On the other hand, this example performs the second process to make the restored image sharper than the unrestored image when the F-number is smaller (or equal to or smaller) than the predetermined value. This enables appropriate image restoration according to the F-number to improve the detection accuracy of the focus state of the image-taking optical system.

Figure 30:
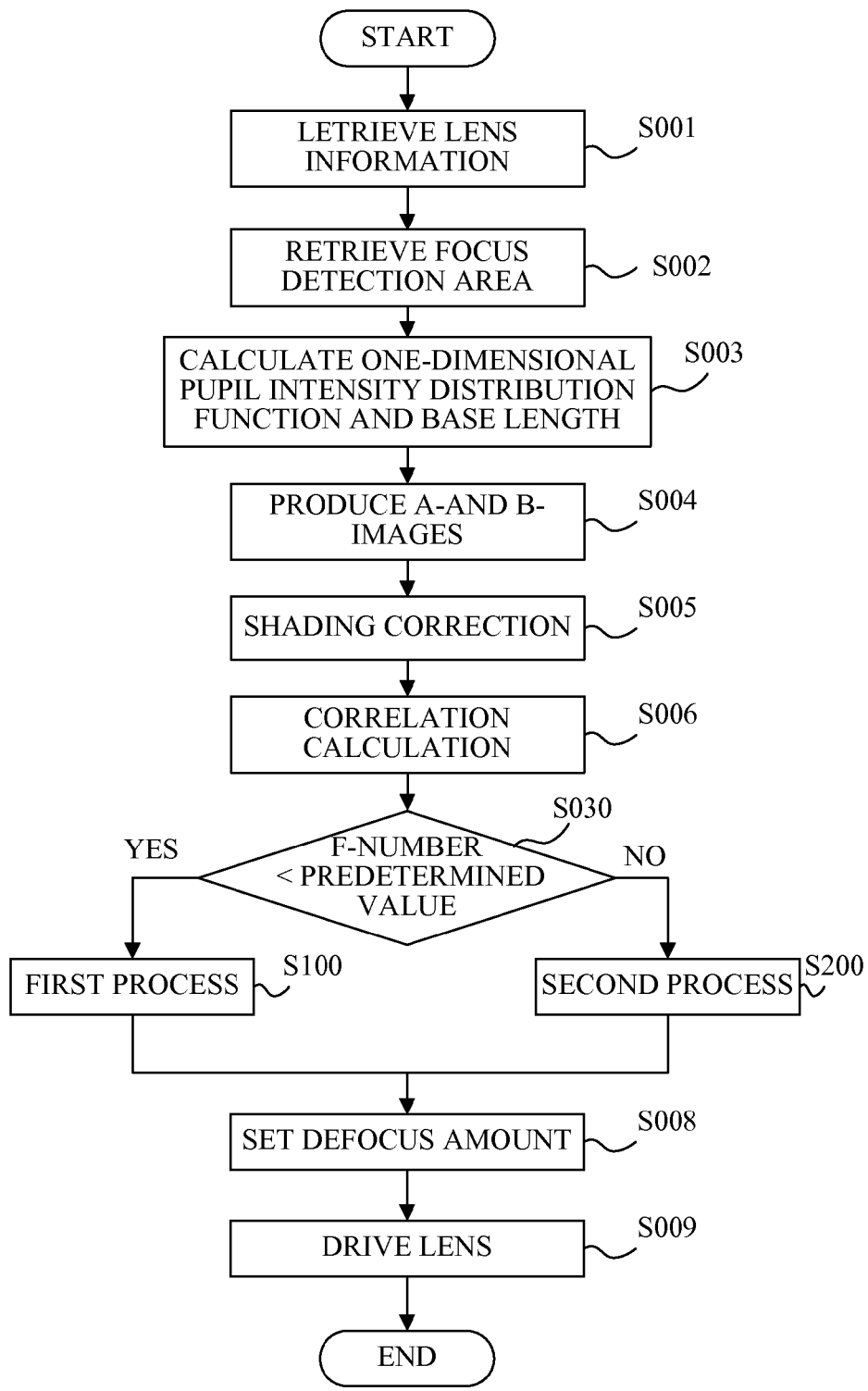
FIG. 30 is a flowchart showing a focus detection process in Example 3 of the present invention.

FIG. 30 is a flowchart of a focus detection process (focus detection method) in this example. In this flowchart, steps shown in FIG. 30 common to those shown in FIG. 20 in Example 1 are denoted by same reference step numbers as those in Example 1, and description thereof will be omitted.

After step S006, the camera CPU 121 determines at step S030 whether or not the F-number of the image-taking optical system is larger than the predetermined value. If the F-number is larger than the predetermined value, the camera CPU 121 proceeds to step S100 to perform the first process. On the other hand, if the F-number is smaller (or equal to or smaller) than the predetermined value, the camera CPU 121 proceeds to step S200 to perform the second process. The first and second processes in this example are same as those in Example 1.

This example performs appropriate image restoration according to the light flux vignetting state and the object image, which enables the improvement of the detection accuracy of the focus state of the image-taking optical system.

Other processes than the above-described processes may be used as the first and second processes.

While the present invention has been described with reference to exemplary examples, it is to be understood that the invention is not limited to the disclosed exemplary examples. The scope of the following claims is to be accorded the broadest interpretation so as to encompass all such modifications and equivalent structures and functions.

This application claims the benefit of Japanese Patent Application No. 2010-174457, filed on Aug. 3, 2010, which is hereby incorporated by reference herein in its entirety.

INDUSTRIAL APPLICABILITY

The present invention provides a focus detection apparatus achieving good focus detection accuracy and an image pickup apparatus including the same.

The invention claimed is:

1. A focus detection apparatus comprising:
an image pickup part configured to include (a) first pixels photoelectrically converting a first image formed by a light flux passing through a first pupil area of an image-forming optical system to produce a first image signal and (b) second pixels photoelectrically converting a second image formed by a light flux passing through a second pupil area of the image-forming optical system to produce a second image signal;
a first signal processor configured to perform a first process to smooth the first and second image signals by using mutually different filters for the first and second image signals;
a second signal processor configured to perform a second process to sharpen the first and second image signals by using mutually different filters for the first and second image signals; and
a calculating part configured to calculate a defocus amount of the image-forming optical system by using the first and second image signals on which the first process or the second process has been performed,
wherein the calculating part is configured to calculate the defocus amount by using the first and second image signals on which the first process has been performed when a contrast value obtained from an output signal from the image pickup part is higher than a predetermined value, and calculate the defocus amount by using the first and second image signals on which the second process has been performed when the contrast value is lower than the predetermined value.

2. A focus detection apparatus comprising: an image pickup part configured to include (a) first pixels photoelectrically converting a first image formed by a light flux passing through a first pupil area of an image-forming optical system to produce a first image signal and (b) second pixels photoelectrically converting a second image formed by a light flux passing through a second pupil area of the image-forming optical system to produce a second image signal; a first signal processor configured to perform a first process to smooth the first and second image signals by using mutually different filters for the first and second image signals; a second signal processor configured to perform a second process to sharpen the first and second image signals by using mutually different filters for the first and second image signals; and a calculating part configured to calculate a defocus amount of the image-forming optical system by using the first and second image signals on which the first process or the second process has been performed, wherein the calculating part is configured to calculate a provisional value of the defocus amount by using the first and second image signals on which the first and second processes have not been performed, and wherein the calculating part is configured to calculate the defocus amount by using the first and second image signals on which the first process has been performed when an absolute value of the provisional value is smaller than a predetermined value, and calculate the defocus amount by using the first and second image signals on which the second process has been performed when the absolute value of the provisional value is greater than the predetermined value.

3. A focus detection apparatus comprising:
an image pickup part configured to include (a) first pixels photoelectrically converting a first image formed by a light flux passing through a first pupil area of an image-forming optical system to produce a first image signal and (b) second pixels photoelectrically converting a second image formed by a light flux passing through a second pupil area of the image-forming optical system to produce a second image signal;
a first signal processor configured to perform a first process to smooth the first and second image signals by using mutually different filters for the first and second image signals;
a second signal processor configured to perform a second process to sharpen the first and second image signals by using mutually different filters for the first and second image signals; and
a calculating part configured to calculate a defocus amount of the image-forming optical system by using the first and second image signals on which the first process or the second process has been performed,
wherein the image-forming optical system includes an aperture stop whose aperture value is variable, and
wherein the calculating part is configured to calculate the defocus amount by using the first and second image signals on which the first process has been performed when the aperture value is greater than a predetermined value, and calculate the defocus amount by using the first and second image signals on which the second process has been performed when the aperture value is smaller than the predetermined value.

4. An image pickup apparatus comprising:
a focus detection apparatus according to claim 1; and
an image generator configured to produce an image based on an output signal from the image pickup part.

5. A focus detection method using an image pickup part configured to include (a) first pixels photoelectrically converting a first image formed by a light flux passing through a first pupil area of an image-forming optical system to produce a first image signal and (b) second pixels photoelectrically converting a second image formed by a light flux passing through a second pupil area of the image-forming optical system to produce a second image signal, the method comprising:
a step of performing a first process to smooth the first and second image signals by using mutually different filters for the first and second image signals;
a step of performing a second process to sharpen the first and second image signals by using mutually different filters for the first and second image signals; and
a calculating step of calculating a defocus amount of the image-forming optical system by using the first and second image signals on which the first process or the second process has been performed,
wherein, in the calculating step, the defocus amount is calculated by using the first and second image signals on which the first process has been performed when a contrast value obtained from an output signal from the image pickup part is higher than a predetermined value, and the defocus amount is calculated by using the first and second image signals on which the second process has been performed when the contrast value is lower than the predetermined value.

6. A focus detection method using an image pickup part configured to include (a) first pixels photoelectrically converting a first image formed by a light flux passing through a first pupil area of an image-forming optical system to produce a first image signal and (b) second pixels photoelectrically converting a second image formed by a light flux passing through a second pupil area of the image-forming optical system to produce a second image signal, the method comprising:

- a step of performing a first process to smooth the first and second image signals by using mutually different filters for the first and second image signals;
- a step of performing a second process to sharpen the first and second image signals by using mutually different filters for the first and second image signals; and
- a calculating step of calculating a defocus amount of the image-forming optical system by using the first and second image signals on which the first process or the second process has been performed,
- wherein, in the calculating step, a provisional value of the defocus amount is calculated by using the first and second image signals on which the first and second processes have not been performed, and
- wherein, in the calculating step, the defocus amount is calculated by using the first and second image signals on which the first process has been performed when an absolute value of the provisional value is smaller than a predetermined value, and the defocus amount is calculated by using the first and second image signals on which the second process has been performed when the absolute value of the provisional value is greater than the predetermined value.

7. A focus detection method using an image pickup part configured to include (a) first pixels photoelectrically converting a first image formed by a light flux passing through a first pupil area of an image-forming optical system to produce a first image signal and (b) second pixels photoelectrically converting a second image formed by a light flux passing through a second pupil area of the image-forming optical system to produce a second image signal, the method comprising:

- a step of performing a first process to smooth the first and second image signals by using mutually different filters for the first and second image signals;
- a step of performing a second process to sharpen the first and second image signals by using mutually different filters for the first and second image signals; and
- a calculating step of calculating a defocus amount of the image-forming optical system by using the first and second image signals on which the first process or the second process has been performed,
- wherein the image-forming optical system includes an aperture stop whose aperture value is variable, and
- wherein, in the calculating step, the defocus amount is calculated by using the first and second image signals on which the first process has been performed when the aperture value is greater than a predetermined value, and the defocus amount is calculated by using the first and second image signals on which the second process has been performed when the aperture value is smaller than the predetermined value.

* * * * *